United States Patent
Ikefuji et al.

(10) Patent No.: US 11,662,459 B2
(45) Date of Patent: May 30, 2023

(54) SYNTHETIC-APERTURE-RADAR-SIGNAL PROCESSING DEVICE, METHOD, AND PROGRAM

(71) Applicant: NEC Corporation, Tokyo (JP)

(72) Inventors: Daisuke Ikefuji, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 16/625,154

(22) PCT Filed: Jun. 23, 2017

(86) PCT No.: PCT/JP2017/023238
§ 371 (c)(1),
(2) Date: Dec. 20, 2019

(87) PCT Pub. No.: WO2018/235271
PCT Pub. Date: Dec. 27, 2018

(65) Prior Publication Data
US 2021/0333389 A1    Oct. 28, 2021

(51) Int. Cl.
*G01S 13/90*    (2006.01)

(52) U.S. Cl.
CPC .......... *G01S 13/9019* (2019.05); *G01S 13/90* (2013.01)

(58) Field of Classification Search
CPC ............ G01S 13/9019; G01S 13/9011; G01S 13/9021; G01S 13/9027; G01S 13/9029; G01S 13/904; G01S 13/53; G01S 13/04; G01S 7/00; G01S 7/42; G01S 7/41; G01S 13/90; G01S 13/00; G01S 13/534
See application file for complete search history.

(56) References Cited

U.S. PATENT DOCUMENTS

| 4,924,229 | A | * | 5/1990 | Eichel ................. G01S 13/9017 342/25 E |
| 5,248,976 | A |   | 9/1993 | Niho et al. |
| 6,037,892 | A | * | 3/2000 | Nikias .................. G01S 13/904 342/25 F |

FOREIGN PATENT DOCUMENTS

| JP | 2003-215240 A | 7/2003 |
| JP | 2004-198275 A | 7/2004 |

(Continued)

OTHER PUBLICATIONS

Ruben Iglesias, et al. "Atmospheric Phase Screen Compensation in Ground-Based SAR With a Multiple-Regression Model Over Mountainous Regions", IEEE Trans. on Geosceience and Remote Sensing, vol. 52, No. 5, pp. 2436-2449, May 2014. (Year: 2014).*

(Continued)

*Primary Examiner* — Bernarr E Gregory
*Assistant Examiner* — Yonghong Li
(74) *Attorney, Agent, or Firm* — Sughrue Mion, PLLC

(57) ABSTRACT

A synthetic-aperture-radar-signal processing device includes a range bin selection unit which selects, from an observed image, range bins including a signal from an isolated reflection point, a phase evaluation unit which evaluates phases in an azimuth direction in the range bins, a window function multiplication unit which designs a window function on the basis of results of the evaluation by the phase evaluation unit and multiply the range bins by the window function, and a phase error correction unit which corrects the observed image by estimating a phase error from the range bins multiplied by the window function.

17 Claims, 15 Drawing Sheets

(56) References Cited

FOREIGN PATENT DOCUMENTS

JP       2013-253889 A    12/2013
JP       2014-044109 A     3/2014

OTHER PUBLICATIONS

International Search Report for PCT Application No. PCT/JP2017/023238, dated Sep. 19, 2017.
Japanese Office Action for JP Application No. 2019-524833 dated Oct. 26, 2021 with English Translation.
Japanese Office Communication for JP Application No. 2019-524833 dated Mar. 8, 2022 with English Translation.

* cited by examiner

SYNTHETIC-APERTURE-RADAR-SIGNAL PROCESSING DEVICE, METHOD, AND PROGRAM

This application is a National Stage Entry of PCT/JP2017/023238 filed on Jun. 23, 2017, the contents of all of which are incorporated herein by reference, in their entirety.

TECHNICAL FIELD

The present invention relates to a synthetic-aperture-radar-signal processing device capable of appropriately determining the range used for phase error estimation in autofocusing.

BACKGROUND ART

FIG. 26 is a block diagram showing the configuration of a synthetic aperture radar device described in Patent Literature (PTL) 1. The synthetic aperture radar device shown in FIG. 26 includes a signal transmission/reception unit 101, an image reconstruction processing unit 102, a range bin selection unit 103, an image shifting unit 104, a window function multiplication unit 105, a phase gradient estimation and compensation unit 106, and a repeat judgment unit 107.

The signal transmission/reception unit 101 supplies high-frequency pulse signals to an antenna (not shown) and receives reflected waves from an observation target range via the antenna. The image reconstruction processing unit 102 reproduces the received signals as a two-dimensional image corresponding to two axes of range and azimuth directions. The range bin selection unit 103 selects range bins within the reproduced image that include an isolated reflection point and side lobes as the reflection components thereof. The image shifting unit 104 shifts each range image in the azimuth direction. The window function multiplication unit 105 extracts, from amplitude information on the reproduced image, the range used for phase error estimation. The phase gradient estimation and compensation unit 106 corrects the reproduced two-dimensional image. The repeat judgment unit 107 judges whether to perform the compensation processing again, on the basis of the amount of phase error remaining in the compensated, two-dimensional image.

An operation of the synthetic aperture radar device shown in FIG. 26 will now be described. FIG. 27 is a flowchart illustrating the operation of the synthetic aperture radar device shown in FIG. 26.

The signal transmission/reception unit 101 emits electromagnetic waves via the antenna and receives the reflected waves (step S101). The signal transmission/reception unit 101 outputs digital signals to the image reconstruction processing unit 102.

The image reconstruction processing unit 102 performs a process of a synthetic aperture radar on the input digital signals to reproduce a two-dimensional image (step S102). The image reconstruction processing unit 102 outputs the two-dimensional image to the range bin selection unit 103.

The range bin selection unit 103 selects one or more range bins in a range including a reflected signal from an isolated point in the reproduced two-dimensional image (step S103). The range bin selection unit 103 outputs one or more images of the selected range bin or bins to the image shifting unit 104.

The image shifting unit 104 shifts, for each selected range bin, each range image in the azimuth direction so that the pixel having a maximum amplitude is centered (step S104).

The image shifting unit 104 outputs the shifted images to the window function multiplication unit 105.

The window function multiplication unit 105 combines the shifted images in the range direction, and designs a rectangular window in the azimuth direction in which a range from the center amplitude up to a predetermined amplitude value is set as a pass area. The window function multiplication unit 105 multiplies each shifted range bin by the designed rectangular window (step S105).

The phase gradient estimation and compensation unit 106 uses the range bins multiplied by the window function to estimate and compensate for a phase error in the reproduced image by a phase gradient algorithm (step S106). The phase gradient algorithm is one of the autofocusing techniques for estimating and compensating for a phase error in a reproduced image. Specific processing is described in PTL 1, for example.

The repeat judgment unit 107 judges whether the amount of phase error in the compensated image is equal to or more than a threshold value. If the amount of phase error is equal to or more than the threshold value, the repeat judgment unit 107 supplies the compensated image to the image shifting unit 104 (step S107). The synthetic aperture radar device repeats the processing in step S104 and on. When the amount of phase error is less than the threshold value, the repeat judgment unit 107 outputs the compensated image.

The technique described in PTL 1 focuses on the circumstances that the phase error estimation accuracy decreases when the amplitude of the background noise is high. The technique estimates the amplitude ratio between the reflected signal from an isolated point and the background noise, and adds weights that assign greater compensation amounts to the points in which the reflected signal from the isolated point is more dominant, thereby reducing the influence of the background noise.

CITATION LIST

Patent Literature

PTL 1: Japanese Patent Application Laid-Open No. 2003-215240

SUMMARY OF INVENTION

Technical Problem

The synthetic aperture radar device described in PTL 1 compensates the image by assigning weights so as to increase the contributions of the points where a reflected signal from an isolated point is dominant at the time of phase error compensation. However, when reflected signals from different points are mixed, the contributions of the reflected signals from unintended points will also increase, leading to degradation in image correction accuracy.

FIG. 28 is a diagram illustrating the problems of the synthetic aperture radar device described in PTL 1. In FIG. 28, z1 shows an observed image obtained when a region where there are a plurality of reflection points is observed. z2 shows a range in which a reflected signal from a specific point is observed. Components of a reflected signal from each point appear in a cross-shape region as in z2. In each reflected signal, the components that extend in the range and azimuth directions as in the cross shape are called side lobes, which are parts of the components of the reflected signal. The frames of broken lines indicated by z3, z4, and z5 show the determined ranges which have been determined on the basis of only the amplitude information. The respective ranges of the broken line frames correspond to the widths of the rectangular windows described above. In FIG. 28, in the range z3, components of other reflected signals are mixed, so the accuracy of the phase error estimation in autofocusing decreases. The ranges z4 and z5 show examples in which signals from closely located reflection points have been erroneously detected as a signal from a single reflection point. The use of the range z4 or z5 leads to degradation of the accuracy of the phase error estimation in autofocusing.

An object of the present invention is to realize autofocusing that is robust against background noise and reflected signals from different points. Another object of the present invention is to realize autofocusing even when an isolated reflection point with high intensity cannot be obtained.

Solution to Problem

The synthetic-aperture-radar-signal processing device according to the present invention includes: a range bin selection unit which selects, from an observed image, range bins including a signal from an isolated reflection point; a phase evaluation unit which evaluates phases in an azimuth direction in the range bins; a window function multiplication unit which designs a window function on the basis of results of the evaluation by the phase evaluation unit and multiply the range bins by the window function; and a phase error correction unit which corrects the observed image by estimating a phase error from the range bins multiplied by the window function.

The synthetic-aperture-radar-signal processing method according to the present invention includes: selecting, from an observed image, range bins including a signal from an isolated reflection point; evaluating phases in an azimuth direction in the range bins; designing a window function on the basis of results of the evaluation and multiplying the range bins by the window function; and correcting the observed image by estimating a phase error from the range bins multiplied by the window function.

The synthetic-aperture-radar-signal processing program according to the present invention causes a computer to perform: range bin selection processing of selecting, from an observed image, range bins including a signal from an isolated reflection point; phase evaluation processing of evaluating phases in an azimuth direction in the range bins; window function multiplication processing of designing a window function on the basis of results of the evaluation in the phase evaluation processing and multiplying the range bins by the window function; and phase error correction processing of correcting the observed image by estimating a phase error from the range bins multiplied by the window function.

Advantageous Effects of Invention

According to the present invention, the accuracy of the phase error estimation in autofocusing improves. The accuracy of the phase error estimation improves even when the reflected signal from an isolated point is weak in intensity or when there are a plurality of reflection points close to each other.

DESCRIPTION OF EMBODIMENT

Embodiments of the present invention will be described below with reference to the drawings.

Embodiment 1

Figure 1:
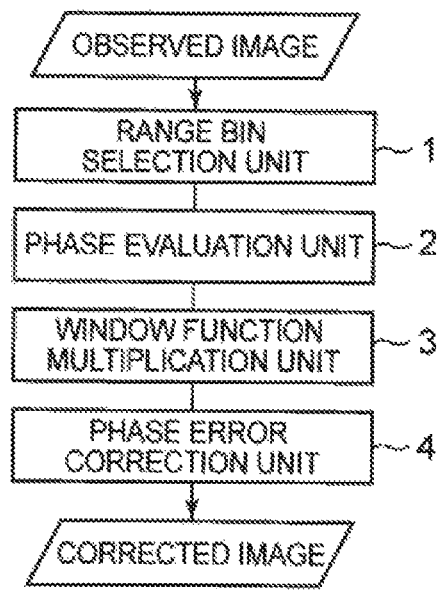
FIG. 1 is a block diagram showing a first embodiment of a synthetic-aperture-radar-signal processing device.

FIG. 1 is a block diagram showing a first embodiment of a synthetic-aperture-radar-signal processing device. The synthetic-aperture-radar-signal processing device shown in FIG. 1 includes a range bin selection unit 1, a phase evaluation unit 2, a window function multiplication unit 3, and a phase error correction unit 4. The range bin selection unit 1, the phase evaluation unit 2, the window function multiplication unit 3, and the phase error correction unit 4 are connected so as to be able to input and output signals.

The range bin selection unit 1 inputs an observed image obtained by the synthetic aperture radar, and selects, in the observed image, range bins including a reflected signal from an isolated point. For example, the range bin selection unit 1 starts searching the observed image in the range direction from a point having a highest amplitude value, and selects the range bins which include up to the point having an amplitude value below a predetermined threshold value. When the positional information on the isolated point in the observed image is known, the range bin selection unit 1 may input the positional information on the isolated point together with the observed image, and select, from the positional information, range bins including the reflected signal from the isolated point. The observed image input to the range bin selection unit 1 is, by way of example, a two-dimensional image corresponding to two axes of range and azimuth directions, which is generated on the basis of signals (reflected signals) according to waves reflected from an observation target range when electromagnetic waves are radiated via an antenna.

The phase evaluation unit 2 evaluates phase information in the azimuth direction in the selected range bins, and determines a range in the azimuth direction in which the phases form about linear line (form a linear phase). The phase evaluation unit 2 outputs the determined range to the window function multiplication unit 3.

The window function multiplication unit 3 takes out, from each range bin selected in the range bin selection unit 1, a range in which a signal from an isolated reflection point exists, and outputs this range to the phase error correction unit 4. The window function multiplication unit 3 designs a rectangular window in the azimuth direction which has the determined range, input from the phase evaluation unit 2, as a pass area. The window function multiplication unit 3 multiplies each range bin selected in the range bin selection unit 1 by the designed rectangular window, and outputs the resultant range bins to the phase error correction unit 4.

The phase error correction unit 4 estimates a phase error for the input range bins by using a phase gradient algorithm or a map drift algorithm, for example, and corrects the observed image by adding or subtracting the estimated phase error to or from the phase of the observed image.

An operation of the synthetic-aperture-radar-signal processing device of the first embodiment will now be described with reference to the flowchart in FIG. 2.

The range bin selection unit 1 selects, from an input, an observed image obtained by the synthetic aperture radar, a plurality of range bins including a reflected signal having a high amplitude value (step S1). Alternatively, the range bin selection unit 1 selects a plurality of range bins from previously given coordinates of the isolated reflection point. The range bin selection unit 1 outputs the selected range bins to the phase evaluation unit 2.

The phase evaluation unit 2 evaluates a phase in the azimuth direction for the selected range bins, to obtain a range in which the phases form about linear line (step S2). The phase evaluation unit 2 outputs the obtained range to the window function multiplication unit 3.

The window function multiplication unit 3 designs, for the obtained range, a rectangular window having the range in the azimuth direction in which the phases form about linear line, as a pass area. The window function multiplication unit 3 then multiplies each range bin, selected by the range bin selection unit 1, by the rectangular window (step S3). The window function multiplication unit 3 outputs the range bins, each multiplied by the rectangular window, to the phase error correction unit 4.

The phase error correction unit 4 estimates the phase error included in each of the input rang bins by using the phase gradient algorithm or the map drift algorithm, for example, and adds or subtracts the estimated phase error to or from the phase of the observed image, to thereby correct the observed image (step S4).

Advantageous effects of the first embodiment will be described. The synthetic-aperture-radar-signal processing device of the first embodiment is configured to obtain the range for estimating the phase error in autofocusing, from the phase information. With such a configuration, the range in which the phase information necessary for autofocusing can be obtained is determined robustly even when background noise and/or signals from other reflection points are mixed.

FIGS. 3A to 3F are diagrams illustrating the advantageous effects of the first embodiment when there is a lot of background noise.

Figure 3A:
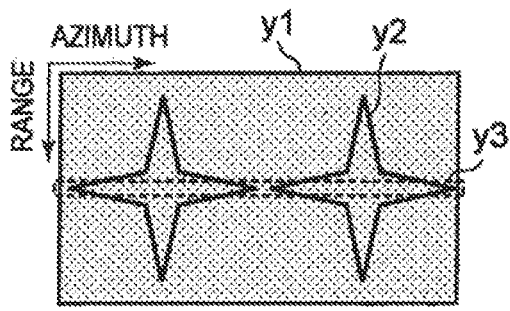
FIG. 3A is a diagram illustrating advantageous effects of the first embodiment.
Figure 3B:
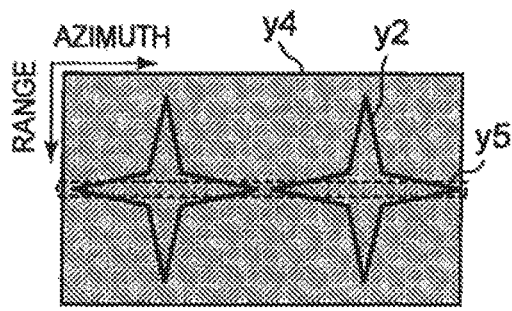
FIG. 3B is a diagram illustrating advantageous effects of the first embodiment.

FIGS. 3A and 3B show observed images having background noise superposed on reflected signals from two reflection points. y1 shows an observed image under the condition of less background noise. y2 shows a range in which a reflected signal from one reflection point appears. y3 shows one of a plurality of range bins selected from within the observed image y1. y4 shows an observed image under the condition of much background noise. y5 shows one of a plurality of range bins selected from within the observed image y4.

Figure 3C:
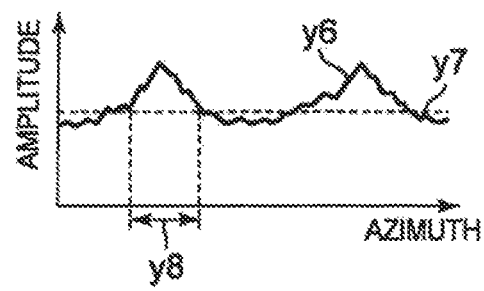
FIG. 3C is a diagram illustrating advantageous effects of the first embodiment.
Figure 3D:
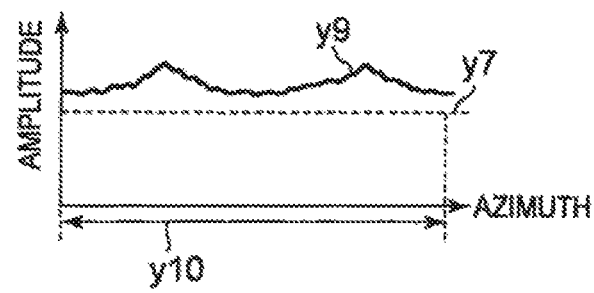
FIG. 3D is a diagram illustrating advantageous effects of the first embodiment.

FIGS. 3C and 3D show results in the case where a range in which a reflected signal from an isolated point is dominant is determined using the "amplitude information" on the signal train in the azimuth direction in the range bins y3 and y5. y6 and y9 show amplitudes in the range bins y3 and y5, respectively. y7 shows a threshold value for determining the range of the rectangular window. y8 and y10 show ranges in which the signal amplitude values become the threshold value or higher when the threshold value y7 is used.

In the result shown in FIG. 3C, the range in which there is a reflected signal from an isolated point is determined distinguishably from the other reflected signal. However, in the result shown in FIG. 3D, the range in which there exist more than one point is determined. It should be noted that the range in which there also exist other reflected signals might be removed by setting the threshold value y7 in accordance with the background noise amount. With this, however, the range in which there exist side-lobe components of the reflected signal from the isolated point is also removed, leading to degradation in accuracy of autofocusing.

Figure 3E:
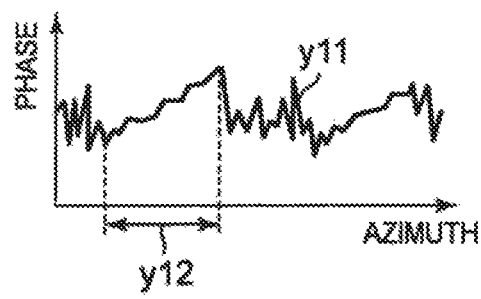
FIG. 3E is a diagram illustrating advantageous effects of the first embodiment.
Figure 3F:
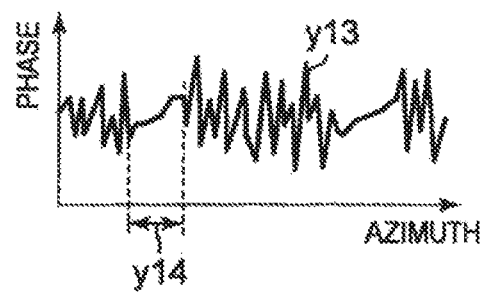
FIG. 3F is a diagram illustrating advantageous effects of the first embodiment.

In FIG. 3, (c) and (f) FIGS. 3E and 3F show results in the case where a range in which a reflected signal from an isolated point is dominant is determined using the "phase information" on the signal train in the azimuth direction in the range bins y3 and y5. That is, they show the ranges determined by the synthetic-aperture-radar-signal processing device of the first embodiment. y11 and y13 show phases in the range bins y3 and y5, respectively. y12 and y14 show ranges in which the phases y11 and y13 form about linear line. In a range in which a reflected signal from an isolated point is dominant, or, in the range where there exists phase information necessary for autofocusing, the phases form about a linear line. Further, in a range in which background noise is dominant, the phases become random.

Therefore, in the first embodiment, as shown in FIGS. 3E and 3F, the range in which the phases form linear line is determined as the range in which the reflected signal from an isolated point is dominant. Further, in the range y12, the determined range extends to the left and right. This is because the determined range includes a range in which there exist side-lobe components that can be used for autofocusing, which were buried in the "amplitude information".

It is understood from the examples shown in FIGS. 3A to 3F that, with the use of the "phase information", a range in which the signal from a single isolated point is dominant can be determined robustly even when background noise is included. It is also understood that, when the background noise has a characteristic of being distributed uniformly within the observed image, the use of the phase enables determining a wide range including the side-lobe components.

FIGS. 4A to 4F are diagrams illustrating the advantageous effects of the first embodiment when reflection points are located close to each other.

Figure 4A:
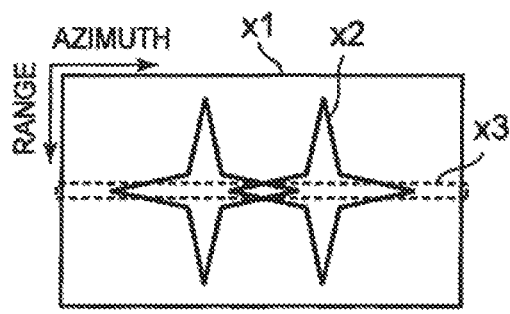
FIG. 4A is a diagram illustrating the advantageous effects of the first embodiment.
Figure 4B:
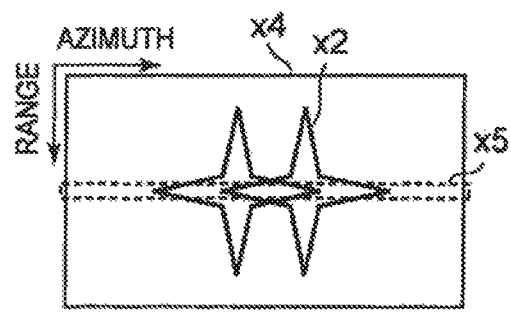
FIG. 4B is a diagram illustrating the advantageous effects of the first embodiment.

FIGS. 4A and 4B show an observed image in which reflected signals from two reflection points are in close proximity, with their side lobes overlapping each other. x1 shows an observed image in the case where the overlapping range is small. x2 shows a range in which a reflected signal from one reflection point appears. x3 shows one of a plurality of range bins selected from within the observed image x1. x4 shows an observed image in the case where the overlapping range is large. x5 shows one of a plurality of range bins selected from within the observed image x4.

Figure 4C:
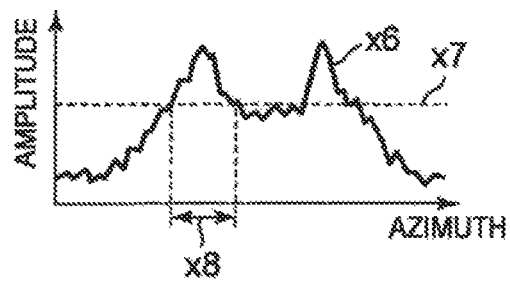
FIG. 4C is a diagram illustrating the advantageous effects of the first embodiment.
Figure 4D:
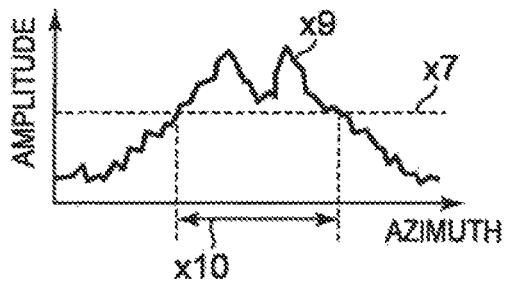
FIG. 4D is a diagram illustrating the advantageous effects of the first embodiment.

FIGS. 4C and 4D show results in the case where a range in which a reflected signal from an isolated point is dominant is determined using the "amplitude information" on the signal train in the azimuth direction in the range bins x3 and x5. x6 and x9 show amplitudes in the range bins x3 and x5, respectively. x7 shows a threshold value for determining the range of the rectangular window. x8 and x10 show ranges in which the signal amplitude values become the threshold value or higher when the threshold value x7 is used. x12 and x14 show ranges in which the phases x11 and x13 can be deemed to form a linear line.

In the result shown in FIG. 4C, the range in which the reflected signal from one isolated point is dominant has been determined successfully, whereas in the result shown in FIG. 4D, the range in which signals from a plurality of points are mixed has been determined.

Figure 4E:
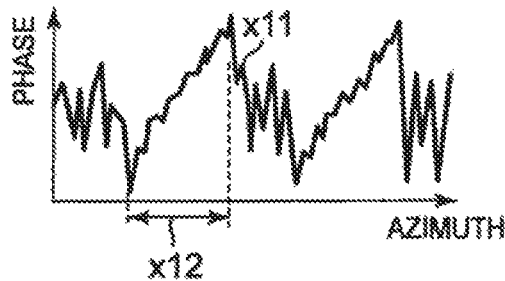
FIG. 4E is a diagram illustrating the advantageous effects of the first embodiment.
Figure 4F:
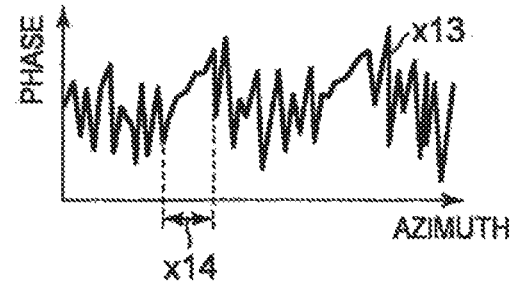
FIG. 4F is a diagram illustrating the advantageous effects of the first embodiment.

FIGS. 4E and 4F show results in the case where a range in which a reflected signal from an isolated point is dominant is determined using the "phase information" on the signal train in the azimuth direction in the range bins x3 and x5. That is, they show the ranges determined by the synthetic-aperture-radar-signal processing device of the first embodiment.

In a range in which a reflected signal from an isolated point is dominant, or, in the range in which there exists the phase information necessary for autofocusing, the phases form linear line. Further, in a range in which reflected signals from different points are superposed on one another, the phase becomes random. Therefore, in the first embodiment, as shown in FIGS. 4E and 4F, the range in which the phases form linear line is determined as the range in which the reflected signal from an isolated point is dominant. Further, the range in which the phases form linear line is determined, excluding the range in which a reflected signal from another point is superposed. In the range x12, the determined range extends to the left. This is because, as with the result shown in FIG. 3E, the determined range also includes the range in which there exist side-lobe components that can be used for autofocusing, which were buried in the "amplitude information".

It is understood from the examples shown in FIGS. 4A to 4F that the use of the "phase information" ensures that a range in which the reflected signal from a single isolated point is dominant is determined robustly even when refection points are located close to each other.

Embodiment 2

Figure 5:
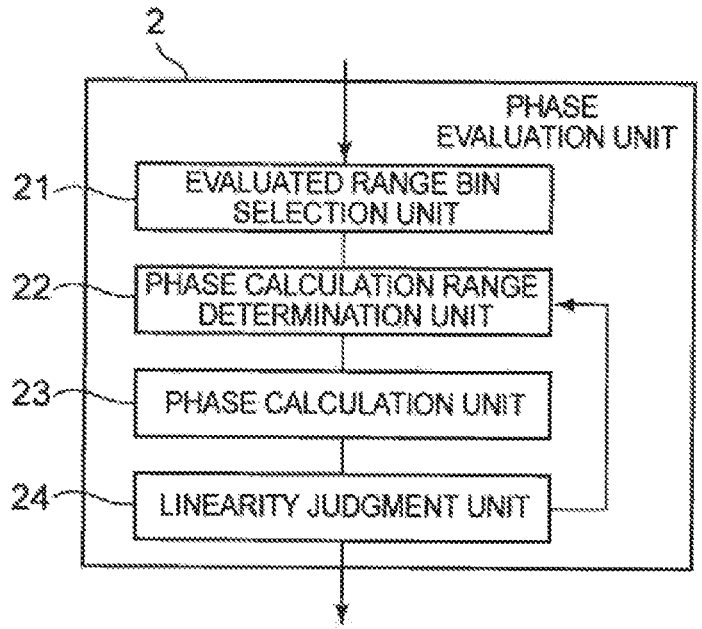
FIG. 5 is a block diagram showing an exemplary configuration of a phase evaluation unit in a second embodiment.

FIG. 5 is a block diagram showing an exemplary configuration of a second embodiment. While a phase evaluation unit 2 is shown in FIG. 5, the overall configuration of the synthetic-aperture-radar-signal processing device is similar to that in the first embodiment shown in FIG. 1.

The phase evaluation unit 2 shown in FIG. 5 includes an evaluated range bin selection unit 21, a phase calculation range determination unit 22, a phase calculation unit 23, and a linearity judgment unit 24. The evaluated range bin selection unit 21, the phase calculation range determination unit 22, the phase calculation unit 23, and the linearity judgment unit 24 are connected so as to be able to input and output signals.

The evaluated range bin selection unit 21 outputs the range bins selected in the range bin selection unit 1 shown in FIG. 1 to the evaluated range bin selection unit 21. The evaluated range bin selection unit 21 selects, from the range bins selected in the range bin selection unit 1, a range bin that includes a reflected signal from an isolated point conspicuously. The evaluated range bin selection unit 21 outputs the selected range bin as an evaluated range bin (range bin to be evaluated), to the phase calculation range determination unit 22. The evaluated range bin selection unit 21 selects a range bin including a point having a highest amplitude value, for example, as the range bin to be evaluated.

The phase calculation range determination unit 22 determines a range for calculating the phases in the azimuth direction in the range bin to be evaluated. The phase calculation range determination unit 22 sets a range enlarged by ± one pixel in the azimuth direction from the point having the highest amplitude value in the range bin to be evaluated, as an initial calculation range. Each time a feedback is obtained from the linearity judgment unit 24, the phase calculation range determination unit 22 outputs a range further enlarged by ± one pixel in the azimuth direction, to the phase calculation unit 23. The way of enlarging the range by ±one pixel is only illustrative; the range may be enlarged in units of ± two or more pixels, for example. Further, the phase calculation range determination unit 22 may be configured to set a maximum possible range as an initial calculation range, and to reduce the phase calculation range each time a feedback is received from the linearity judgment unit 24.

The phase calculation unit 23 calculates phases in the range bin to be evaluated in the determined phase calculation range. The phase calculation unit 23 then performs phase unwrapping processing on the calculated phases, and outputs the resultant phases to the linearity judgment unit 24. In the phase unwrapping processing, the phase calculation unit 23 assumes that the adjacent points have continuous phases. When the absolute variation amount between the adjacent phases exceeds a π radian, the phase calculation unit 23 adds 2 π radians in the plus or minus direction. The phase calculation unit 23 obtains the phase spectrum of each point such that the absolute variation amount is not greater than the π radian. The phase calculation unit 23 may perform the phase unwrapping processing in a manner other than the above-described manner.

The linearity judgment unit 24 judges whether the input phases form a linear line. When the linearity judgment unit 24 judges that the calculated phases form linear line, the phase calculation range determination unit 22 performs the processing again. When the linearity judgment unit 24 judges that the calculated phases do not form linear line, the linearity judgment unit 24 outputs a phase calculation range in which the phases form linear line, to the window function multiplication unit 3 shown in FIG. 1. By way of example, the linearity judgment unit 24 outputs a maximum phase calculation range in which the phases form about linear line, to the window function multiplication unit 3.

In the case where the phase calculation range determination unit 22 determines the range in which the phases form linear line by reducing the range from the maximum possible range as well, the calculation range in which the phase form about linear line is output to the window function multiplication unit 3, although the branch conditions in the linearity judgment unit 24 become opposite.

An operation of the phase evaluation unit 2 will now be described with reference to the flowchart in FIG. 6.

The evaluated range bin selection unit 21 selects, from the range bins selected in the processing in step S1 (see FIG. 2), a range bin that includes a pixel having a strong signal reflected from an isolated point (step S21). For example, the evaluated range bin selection unit 21 selects, from the selected range bins, a range bin that has a pixel with the highest amplitude value, as an evaluated range bin. The evaluated range bin selection unit 21 outputs the selected range bin, as the evaluated range bin, to the phase calculation range determination unit 22.

The phase calculation range determination unit 22 enlarges a range in which the phases are to be calculated in the input evaluated range bin, using the pixel with the greatest amplitude value as the center, and sets the enlarged range as the phase calculation range (step S22). The phase calculation range determination unit 22 outputs the enlarged range to the phase calculation unit 23. It should be noted that the phase calculation range determination unit 22 sets a range with ± one pixel from the pixel with the greatest amplitude value as an initial calculation range, and enlarges the range each time a feedback is obtained from the linearity judgment unit 24.

The phase calculation unit 23 calculates the phases in the range determined in the processing in step S22 of the evaluated range bin, selected in the processing in step S21. Further, the phase calculation unit 23 performs phase unwrapping processing on the calculated phases, and outputs the unwrapped phase to the linearity judgment unit 24 (step S23).

The linearity judgment unit 24 judges whether the phases calculated in the processing in step S23 form a linear line (step S24). When the linearity judgment unit 24 judges that the calculated phase is linear, the process returns to step S22. When the linearity judgment unit 24 judges that the calculated phase is not linear, the linearity judgment unit 24 outputs the phase calculation range in which the phases have been deemed to forma a linear line in the past judgment processing.

Figure 2:
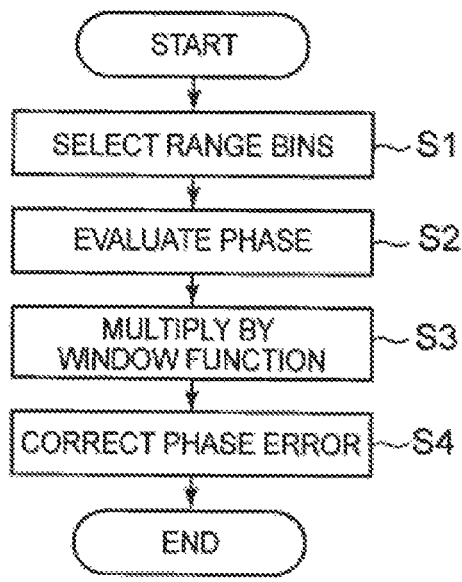
FIG. 2 is a flowchart illustrating an operation of the synthetic-aperture-radar-signal processing device of the first embodiment.

Then, the window function multiplication unit 3 and the phase error correction unit 4 (see FIG. 1) perform the processing in steps S3 and S4 shown in FIG. 2.

Advantageous effects of the second embodiment will be described. In the second embodiment, a range in which the phases of the reflected signal are deemed to form a linear line is obtained, whereby the range is determined from which the influence of the background noise and the like has been removed, with the phase information on the reflected signal from the isolated point being maintained.

Figure 7:
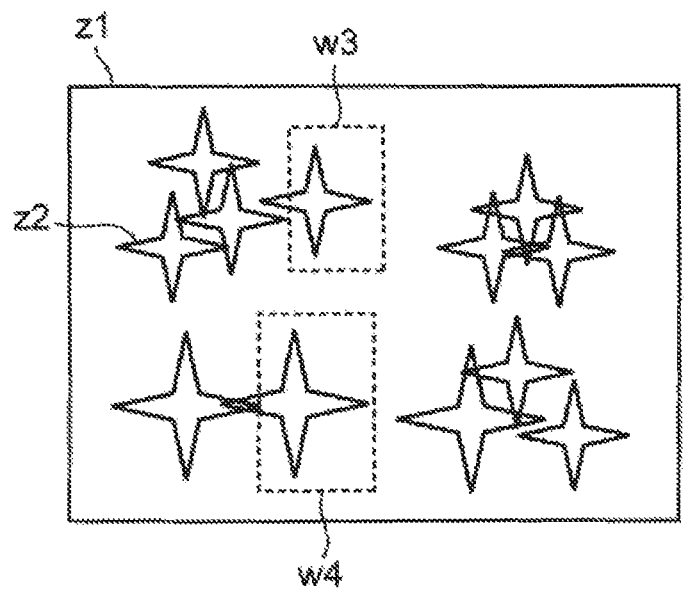
FIG. 7 is a diagram illustrating advantageous effects of the second embodiment.
Figure 28:
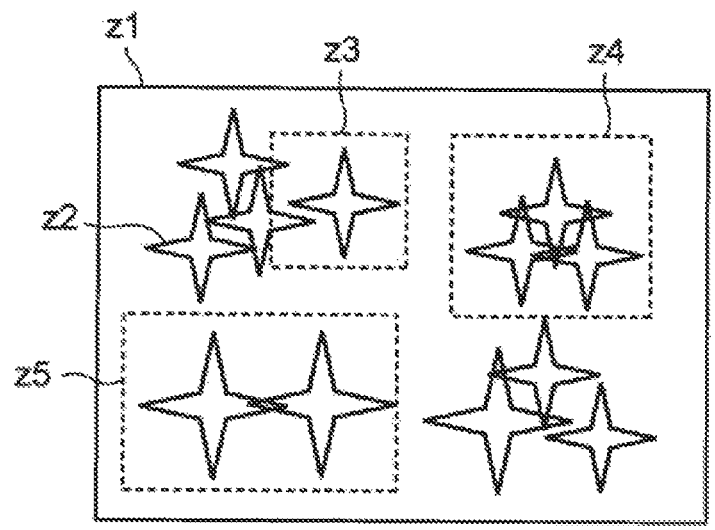
FIG. 28 is a diagram illustrating problems of the synthetic aperture radar device described in PTL 1.

FIG. 7 is a diagram illustrating the advantageous effects of the second embodiment. In FIG. 7, z1 shows an observed image of a region where there are a plurality of reflection points, as with z1 shown in FIG. 28. z2 shows a range in which a reflected signal from a specific point is observed, as with z2 shown in FIG. 28. w3 and w4 show ranges for autofocusing, which are determined in the second embodiment. In the second embodiment, the range in which the phases are deemed to form a linear line is calculated for the signals in the evaluated range bin, so the range in which the information on the reflected signal from an isolated point is dominant can be set wider. As a result, the synthetic-aperture-radar-signal processing device is able to implement autofocusing that is robust against the signals from other reflection points and the background noise, to thereby obtain a high-quality corrected image.

Embodiment 3

Figure 8:
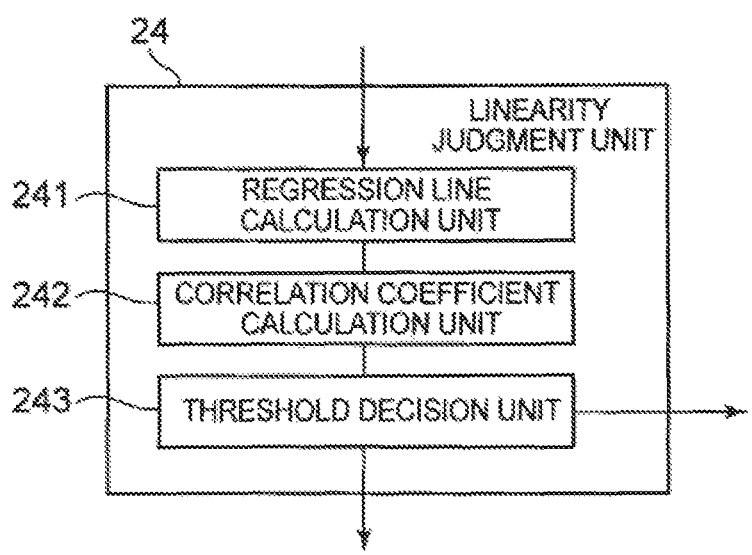
FIG. 8 is a block diagram showing an exemplary configuration of a linearity judgment unit in a third embodiment.

FIG. 8 is a block diagram showing an exemplary configuration of a third embodiment. While a linearity judgment unit 24 is shown in FIG. 8, the overall configuration of the phase evaluation unit 2 is similar to that in the second embodiment shown in FIG. 5. Further, the overall configuration of the synthetic-aperture-radar-signal processing device is similar to that in the first embodiment shown in FIG. 1.

As shown in FIG. 8, the linearity judgment unit 24 includes a regression line calculation unit 241, a correlation coefficient calculation unit 242, and a threshold judgment unit 243. The regression line calculation unit 241, the correlation coefficient calculation unit 242, and the threshold judgment unit 243 are connected so as to be able to input and receive signals.

The linearity judgment unit 24 outputs the phase calculated in the phase calculation unit 23 shown in FIG. 5 to the regression line calculation unit 241. The regression line calculation unit 241 calculates a regression line of the input phase, and outputs the regression line to the correlation coefficient calculation unit 242. The correlation coefficient calculation unit 242 calculates a correlation coefficient between the phase calculated in the phase calculation unit 23 and the regression line calculated in the regression line calculation unit 241, and outputs the correlation coefficient to the threshold judgment unit 243.

The threshold judgment unit 243 judges whether the correlation coefficient calculated in the correlation coefficient calculation unit 242 is not lower than a predetermined threshold value, and deems that the phases form a linear line when the correlation coefficient is not lower than the threshold value. It should be noted that the threshold value of about 0.8 to about 0.9, for example, is the value that can implement autofocusing robustly against the signals from other reflection points and background noise. The threshold judgment unit 243 may deem that the phases form a linear line when the correlation coefficient exceeds a predetermined threshold value.

When the linearity judgment unit 24 judges from the result of the threshold judgment unit 243 that the calculated phases form linear line, the phase calculation range determination unit 22 performs the processing again. When the linearity judgment unit 24 judges that the calculated phase do not form linear line, the linearity judgment unit 24 outputs the phase calculation range in which the phases can be deemed to form linear line, to the window function multiplication unit 3. For example, the linearity judgment unit 24 outputs the maximum phase calculation range in which the phase can be deemed to form linear line, to the window function multiplication unit 3.

Figure 9:
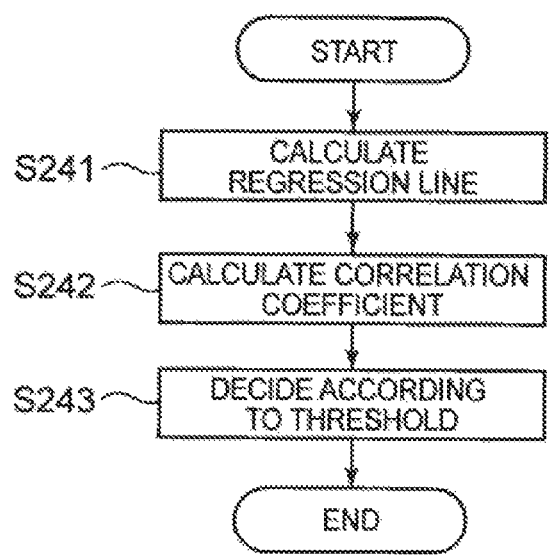
FIG. 9 is a flowchart illustrating an operation of the linearity judgment unit in the third embodiment.

An operation of the linearity judgment unit 24 will now be described with reference to the flowchart in FIG. 9.

Figure 6:
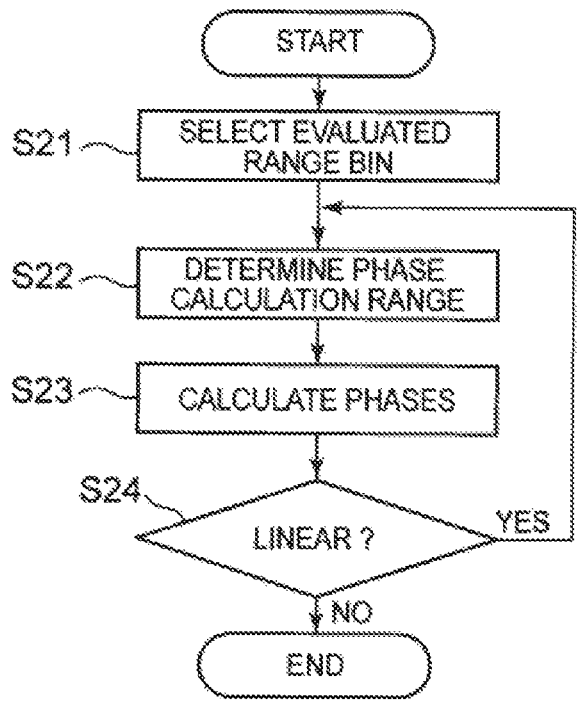
FIG. 6 is a flowchart illustrating an operation of the phase evaluation unit in the second embodiment.

The regression line calculation unit 241 calculates a regression line of the phases calculated in the processing in step S23 shown in FIG. 6 (step S241). The regression line calculation unit 241 outputs the calculated regression line to the correlation coefficient calculation unit 242. The correlation coefficient calculation unit 242 calculates a correlation coefficient between the phases calculated in the processing in step S23 and the regression line calculated in the processing in step S241 (step S242). The correlation coefficient calculation unit 242 outputs the calculated correlation coefficient to the threshold judgment unit 243.

In the processing in step S243, the threshold judgment unit 243 judges whether the calculated correlation coefficient is not lower than a predetermined threshold value, and when it is not lower than the threshold value, the threshold judgment unit 243 deems that the phases form a linear line. The process then returns to step S22. When it is lower than the threshold value, the linearity judgment unit 24 outputs the phase calculation range in which the phases have been deemed to form a linear line in the past threshold judgment processing, to the window function multiplication unit 3.

Then, the window function multiplication unit 3 and the phase error correction unit 4 (see FIG. 1) perform the processing in steps S3 and S4 shown in FIG. 2.

Advantageous effects of the third embodiment will be described. In the third embodiment, the linearity of the phase of the signal is evaluated using the correlation coefficient. That is, the characteristic that the correlation coefficient becomes higher as a shape constructed by the phases of the reflected signals more approximate to be linear is utilized to determine the range in which the reflected signal from an isolated point is dominant. This makes it possible to determine the range in which a constant correlation coefficient is obtained irrespective of the influence of the other reflection points and the background noise amount, or, the range in which the reflected signal from an isolated point is dominant. Further, it has been found through the experiment that the threshold value of about 0.8 to about 0.9 realizes autofocusing that is robust against the background noise and the like. The synthetic-aperture-radar-signal processing device of the third embodiment is able to implement autofocusing that is robust against the signals from other reflection points and the background noise, to thereby obtain a high-quality corrected image.

Embodiment 4

Figure 10:
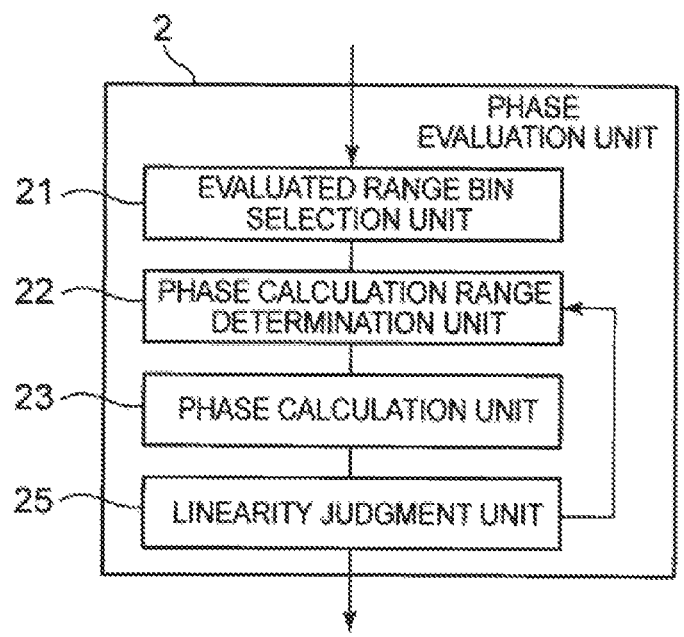
FIG. 10 is a block diagram showing an exemplary configuration of a phase evaluation unit in a fourth embodiment.

FIG. 10 is a block diagram showing an exemplary configuration of a fourth embodiment. While a phase evaluation unit 2 is shown in FIG. 10, the overall configuration of the synthetic-aperture-radar-signal processing device is similar to that in the first embodiment shown in FIG. 1.

The phase evaluation unit 2 shown in FIG. 10 includes an evaluated range bin selection unit 21, a phase calculation range determination unit 22, a phase calculation unit 23, and a linearity judgment unit 25. The evaluated range bin selection unit 21, the phase calculation range determination unit 22, the phase calculation unit 23, and the linearity judgment unit 25 are connected so as to be able to input and output signals.

The functions of the linearity judgment unit 25 differ from the functions of the linearity judgment unit 24 in the second embodiment shown in FIG. 5. The other configurations and functions of the phase evaluation unit 2 are identical to the configurations and functions in the second embodiment.

Figure 11:
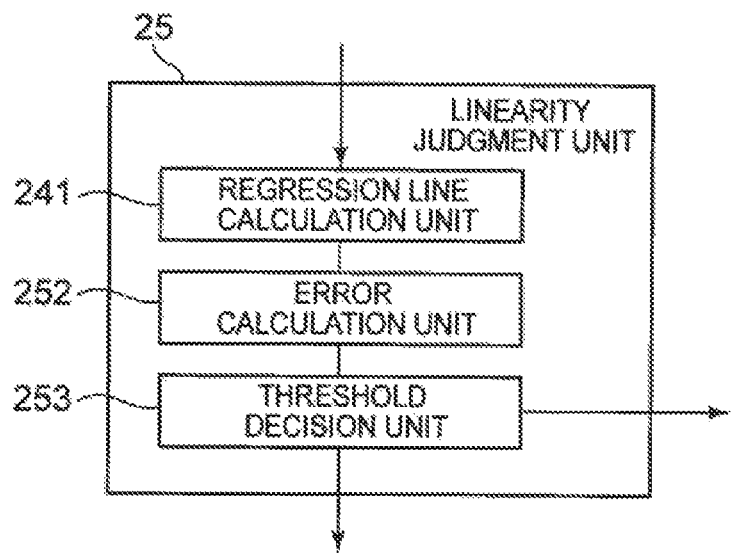
FIG. 11 is a block diagram showing an exemplary configuration of a linearity judgment unit in the fourth embodiment.

FIG. 11 is a block diagram showing an exemplary configuration of the linearity judgment unit 25. The linearity judgment unit 25 includes a regression line calculation unit 241, an error calculation unit 252, and a threshold judgment unit 253. The regression line calculation unit 241 in the linearity judgment unit 25 has the configuration and functions identical to the corresponding configuration and functions in the third embodiment. The functions of the threshold judgment unit 253 differ from the functions of the threshold judgment unit 243 in the third embodiment.

The linearity judgment unit 25, as in the second embodiment, judges whether the phases calculated in the phase calculation unit 23 form a linear line. The error calculation unit 252 calculates an error between the phase calculated in the phase calculation unit 23 and the regression line calculated in the regression line calculation unit 241. As the error, the error calculation unit 252 calculates, for example, a mean square error or Euclidean distance between the phase and the regression line.

The threshold judgment unit 253 judges whether the error calculated in the error calculation unit 252 is not lower than a predetermined threshold value. When the error amount is lower than the threshold value, the linearity judgment unit 25 deems that the phases form a linear line. When the phases form a linear line, the phase calculation range determination unit 22 performs the processing again. The phase evaluation is then performed in a wider range. It should be noted that the linearity judgment unit 25 may deem that the phases form a linear line when the error amount is not higher than the threshold value.

When judging that the calculated phases do not form a linear line, the linearity judgment unit 25 outputs the range in which the phases have been deemed to form a linear line in the past processing, to the window function multiplication unit 3.

An operation of the phase evaluation unit 2 will now be described with reference to the flowchart in FIG. 12.

Figure 12:
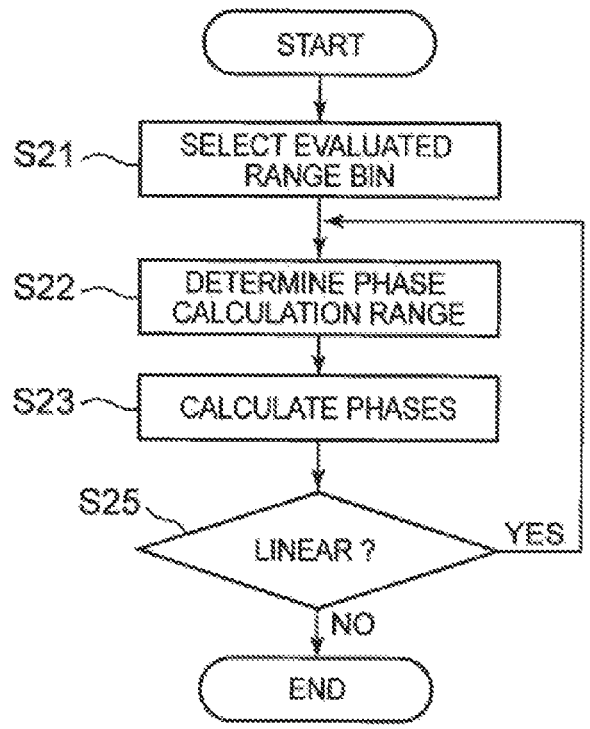
FIG. 12 is a flowchart illustrating an operation of the phase evaluation unit in the fourth embodiment.

When comparing the operation of the phase evaluation unit 2 illustrated in FIG. 12 with the operation of the phase evaluation unit 2 in the second embodiment illustrated in FIG. 6, the linearity judgment processing (step S25) in the linearity judgment unit 25 differs from the linearity judgment processing (step S24) in the second embodiment. The other processing is identical to that in the second embodiment.

Figure 13:
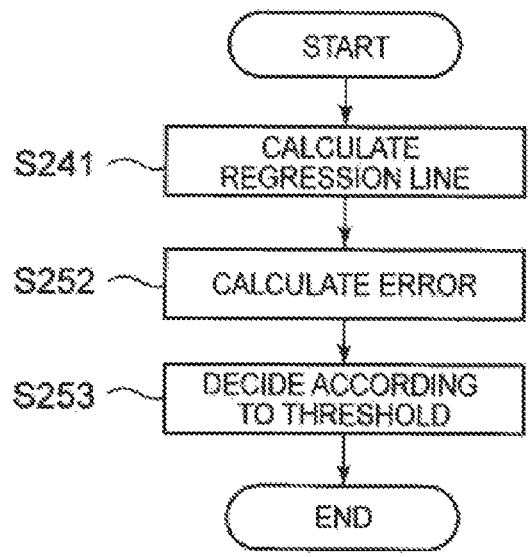
FIG. 13 is a flowchart illustrating processing of the linearity judgment unit in the fourth embodiment.

FIG. 13 is a flowchart illustrating the linearity judgment processing in step S25. The regression line calculation unit 241 in the linearity judgment unit 25 calculates a regression line of the phase (step S241) as in the third embodiment. In the fourth embodiment, the error calculation unit 252 calculates an error between the phase calculated in the processing in step S23 and the regression line calculated in the processing in step S241 (step S252). In calculating the error, the error calculation unit 252 utilizes a mean square error or Euclidean distance between the phase and the regression line, for example. The error calculation unit 252 outputs the calculated error to the threshold judgment unit 253.

The threshold judgment unit 253 judges whether the error obtained in the processing in step S252 is a predetermined threshold value or higher (step S253). When the error is lower than the threshold value, the linearity judgment unit 25 deems that the phases form a linear line. Then, the process returns to step S22 to further evaluate the phase in a wider azimuth range. When the error is not lower than the threshold value, the linearity judgment unit 25 outputs the phase calculation range in which the phases have been deemed to form a linear line in the past threshold judgment processing, to the window function multiplication unit 3.

It should be noted that the error calculated in the processing in step S252 tends to increase exponentially as more signals other than the reflected signal from an isolated point are mixed. Thus, the threshold judgment unit 253 may be adapted to update the threshold value to a constant multiplication of the past error successively each time the repeat processing (steps S22 to S25) in FIG. 12 is performed, and to terminate the processing when the error exceeds the threshold value, or, when the error increases considerably.

Advantageous effects of the fourth embodiment will be described. In the fourth embodiment, the phase of the reflected signal is evaluated using the error amount. At this time, the characteristic that the error amount increases exponentially as the background noise and/or the other reflected signals are mixed in an increased amount in the reflected signal from an isolated point is utilized. On the basis of such a characteristic, the range in which the increase in error is moderate is searched for, to thereby determine the range in which the influence of the background noise and the like can be estimated small. Further, in the case of determining the range while successively updating the threshold value for judgment of the error amount, the method can be applied to a variety of observed images. With such a configuration, the synthetic-aperture-radar-signal processing device of the fourth embodiment is able to implement autofocusing that is robust against the signals from other reflection points and the background noise, to thereby obtain a high-quality corrected image.

Embodiment 5

Figure 14:
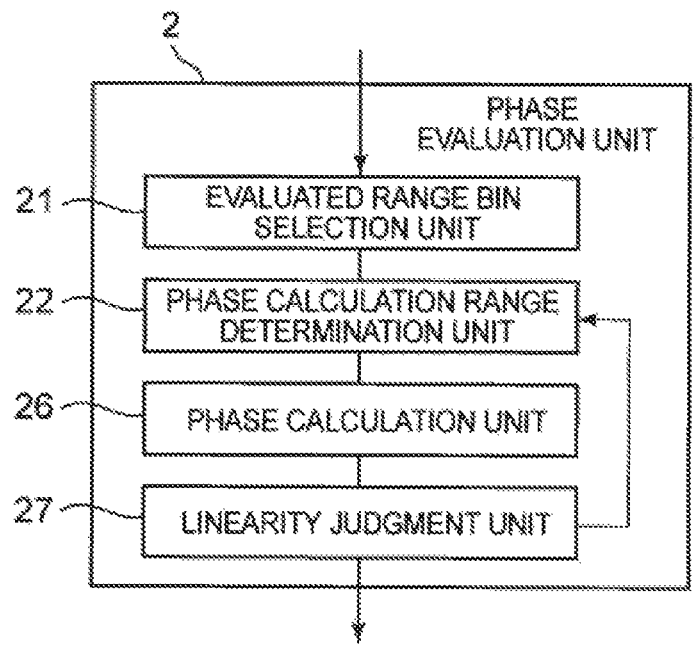
FIG. 14 is a block diagram showing an exemplary configuration of a phase evaluation unit in a fifth embodiment.

FIG. 14 is a block diagram showing an exemplary configuration of a fifth embodiment. While a phase evaluation unit 2 is shown in FIG. 14, the overall configuration of the synthetic-aperture-radar-signal processing device is similar to that in the first embodiment shown in FIG. 1.

The phase evaluation unit 2 shown in FIG. 14 includes an evaluated range bin selection unit 21, a phase calculation range determination unit 22, a phase calculation unit 26, and a linearity judgment unit 27. The evaluated range bin selection unit 21, the phase calculation range determination unit 22, the phase calculation unit 26, and the linearity judgment unit 27 are connected so as to be able to input and output signals.

The functions of the phase calculation unit 26 and the linearity judgment unit 27 differ from the functions of the phase calculation unit 23 and the linearity judgment unit 24 in the second embodiment shown in FIG. 5. The other configurations and functions of the phase evaluation unit 2 are identical to the corresponding configurations and functions in the second embodiment.

The phase calculation unit 26 calculates phases on the frequency axis in the evaluated range bins, in the phase calculation range determined in the phase calculation range determination unit 22. For example, the phase calculation unit 26 sets the amplitude value of the points outside the determined phase calculation range to 0, and performs a Fourier transform in the azimuth direction to realize the calculation of the phase on the frequency axis. Then, the phase calculation unit 26 performs phase unwrapping processing on the calculated phase, and outputs the resultant phases to the linearity judgment unit 27.

Figure 15:
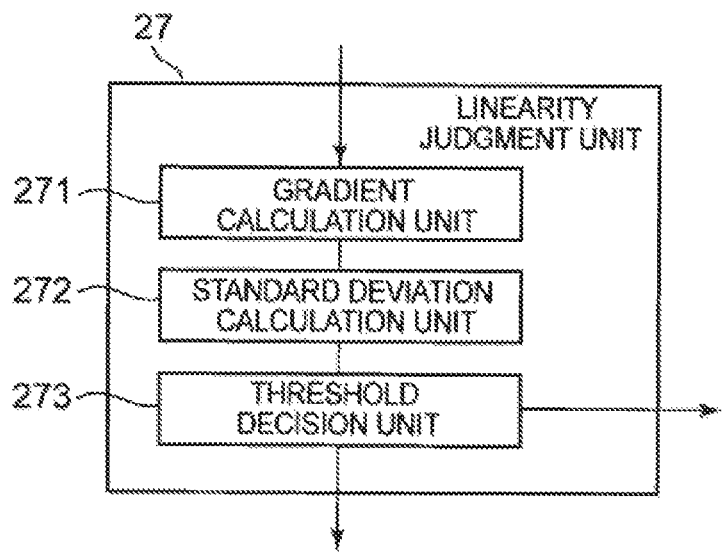
FIG. 15 is a block diagram showing an exemplary configuration of a linearity judgment unit in the fifth embodiment.

FIG. 15 is a block diagram showing an exemplary configuration of the linearity judgment unit 27. The linearity judgment unit 27 includes a gradient calculation unit 271, a standard deviation calculation unit 272, and a threshold judgment unit 273. The linearity judgment unit 27 focuses on the gradient of the phase actually utilized in the phase error correction unit 4, to estimate the range for use in autofocusing.

The gradient calculation unit 271 calculates a gradient vector from the phases calculated in the phase calculation unit 26. The gradient calculation unit 271 outputs the calculated gradient vector to the standard deviation calculation unit 272. The standard deviation calculation unit 272 calculates a standard deviation of the input gradient vector. The standard deviation calculation unit 272 outputs the calculated standard deviation to the threshold judgment unit 273.

The threshold judgment unit 273 compares the calculated standard deviation with a predetermined threshold value, and deems that the phases form a linear line when the value of the standard deviation is lower than the threshold value. When the phases are deemed to form a linear phase, the phase calculation range determination unit 22 performs the processing again. When the value of the standard deviation is not lower than the threshold value, the linearity judgment unit 27 outputs the range in which the phases have been deemed to form a linear line in the past processing, to the window function multiplication unit 3.

An operation of the phase evaluation unit 2 will now be described with reference to the flowchart in FIG. 16.

Figure 16:
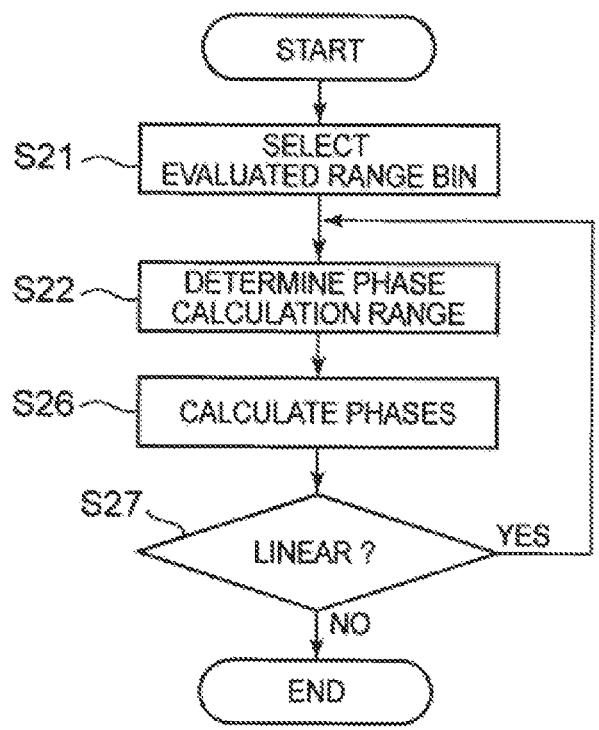
FIG. 16 is a flowchart illustrating an operation of the phase evaluation unit in the fifth embodiment.

When comparing the operation of the phase evaluation unit 2 illustrated in FIG. 16 with the operation of the phase evaluation unit 2 in the second embodiment illustrated in FIG. 6, the phase calculation processing (step S26) by the phase calculation unit 26 and the linearity judgment processing (step S27) by the linearity judgment unit 27 differ from the phase calculation processing (step S23) and the linearity judgment processing (step S24) in the second embodiment. The other processing is identical to that in the second embodiment.

The phase calculation unit 26 calculates phases on the frequency axis in the evaluated range bins, in the phase calculation range determined in step S22 (step S26). Specifically, the phase calculation unit 26 sets the amplitude values of the pixels outside the determined range to 0, and then performs a Fourier transform in the azimuth direction on the evaluated range bins to calculate the phase. Further, the phase calculation unit 26 performs phase unwrapping processing on the calculated phases, and outputs the unwrapped phase to the linearity judgment unit 27.

Figure 17:
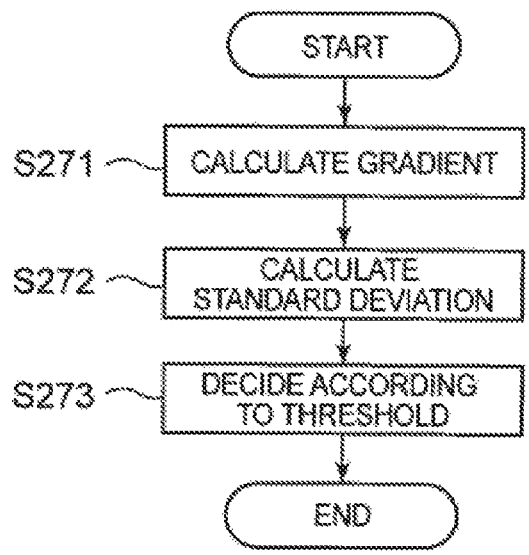
FIG. 17 is a flowchart illustrating processing of the linearity judgment unit in the fifth embodiment.

FIG. 17 is a flowchart illustrating the linearity judgment processing in step S27. The gradient calculation unit 271 in the linearity judgment unit 27 calculates a gradient vector of the phase calculated in the processing in step S26 (step S271). The gradient calculation unit 271 outputs the calculated gradient vector to the standard deviation calculation unit 272.

The standard deviation calculation unit 272 calculates a standard deviation of the gradient vector calculated in the processing in step S271 (step S272). The standard deviation calculation unit 272 outputs the calculated standard deviation to the threshold judgment unit 273.

The threshold judgment unit 273 judges whether the standard deviation obtained in the processing in step S272 is not lower than a predetermined threshold value. When the standard deviation is lower than the threshold value, the linearity judgment unit 27 deems that the phases form a linear line. When the phases are deemed to form a linear line, the phase calculation range determination unit 22 performs the processing again. The phase evaluation is then performed in a wider range.

When the standard deviation is not lower than the threshold value, the linearity judgment unit 27 outputs the phase calculation range in which the phases have been deemed to form a linear line in the past threshold judgment processing, to the window function multiplication unit 3.

Advantageous effects of the fifth embodiment will be described. In the fifth embodiment, the phase of the reflected signal is evaluated on the frequency axis. At this time, the characteristic is utilized that, when a phase error to be estimated changes continuously, in the range in which the reflected signal from an isolated point is dominant, the gradient vector of the phase approximates 0. That is, the range in which the reflected signal from an isolated point is dominant is determined by searching for the range in which the standard deviation of the gradient vector is small. On the basis of such a characteristic, the synthetic-aperture-radar-signal processing system is able to implement autofocusing that is robust against the signals from other reflection points and the background noise, thereby obtaining a high-quality corrected image.

Embodiment 6

Figure 18:
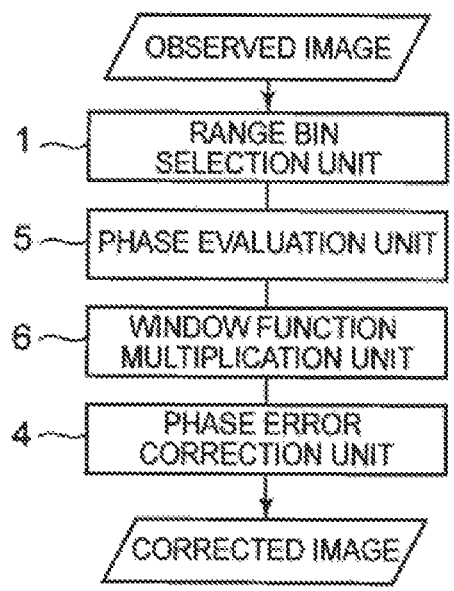
FIG. 18 is a block diagram showing a sixth embodiment of a synthetic-aperture-radar-signal processing device.

FIG. 18 is a block diagram showing a sixth embodiment of a synthetic-aperture-radar-signal processing device. The synthetic-aperture-radar-signal processing device shown in FIG. 18 includes a range bin selection unit 1, a phase evaluation unit 5, a window function multiplication unit 6, and a phase error correction unit 4. The range bin selection unit 1, the phase evaluation unit 5, the window function multiplication unit 6, and the phase error correction unit 4 are connected so as to be able to input and output signals. The range bin selection unit 1 and the phase error correction unit 4 have their configurations and functions identical to the configurations and functions of those units in the first embodiment.

Figure 19:
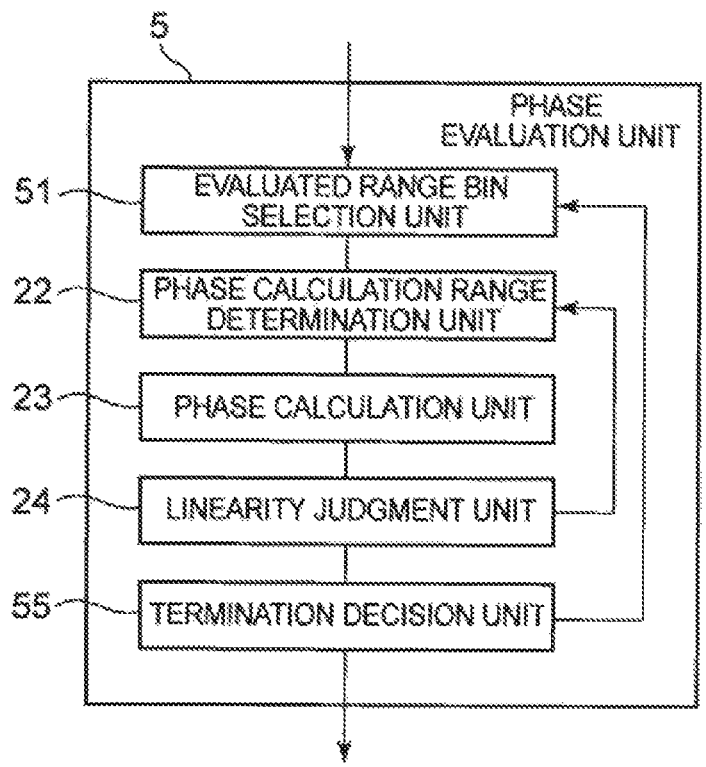
FIG. 19 is a block diagram showing an exemplary configuration of a phase evaluation unit in the sixth embodiment.

FIG. 19 is a block diagram showing an exemplary configuration of the phase evaluation unit 5 in the sixth embodiment. The phase evaluation unit 5 shown in FIG. 19 includes an evaluated range bin selection unit 51, a phase calculation range determination unit 22, a phase calculation unit 23, a linearity judgment unit 24, and an end judgment unit 55. The evaluated range bin selection unit 51, the phase calculation range determination unit 22, the phase calculation unit 23, the linearity judgment unit 24, and the end judgment unit 55 are connected so as to be able to input and receive signals. The phase calculation range determination unit 22, the phase calculation unit 23, and the linearity judgment unit 24 have their configurations and functions identical to the configurations and functions of those units in the second embodiment shown in FIG. 5.

The phase evaluation unit 5 evaluates a phase in the azimuth direction for a respective one of the plurality of range bins selected in the range bin selection unit 1. The phase evaluation unit 5 outputs a range in which the phases in the azimuth direction can be deemed to form a linear line in each range bin, to the window function multiplication unit 6.

The evaluated range bin selection unit 51 in the phase evaluation unit 5 selects a range bin for evaluating the phase, from the range bins selected in the range bin selection unit 1. The evaluated range bin selection unit 51 selects a range bin from among the range bins selected in the range bin selection unit 1 as an evaluated range bin, and selects another range bin as the evaluated range bin each time a feedback is received from the end judgment unit 55. For example, the evaluated range bin selection unit 51 selects, from the range bins selected in the range bin selection unit 1, a range bin including a pixel with a highest luminance value in turn.

The end judgment unit 55 judges whether a predetermined number of range bins have been selected in the processing in the evaluated range bin selection unit 51. When judging that the predetermined number of range bins have been selected as the evaluated range bins, the end judgment unit 55 outputs the range in which the phases are deemed to form a linear line for each range bin, to the window function multiplication unit 6. It should be noted that the end judgment unit 55 uses, as the number of range bins to be evaluated, the number of range bins including a pixel having a luminance value of not lower than −20 dB from the pixel with the highest luminance value, for example, among the range bins selected in the range bin selection unit 1. Alternatively, the end judgment unit 55 may use the number of range bins selected in the range bin selection unit 1 as it is.

The window function multiplication unit 6 designs, for the respective range bins selected in the evaluated range bin selection unit 51, window functions having the corresponding ranges input from the phase evaluation unit 5 as the pass area. Then, the window function multiplication unit 6 multiplies the respective selected range bins by the corresponding window functions, and outputs the resultant range bins to the phase error correction unit 4.

The phase error correction unit 4 uses the input range bins that have been multiplied by the window functions to estimate a phase error based on a relative sway of the target of observation, and corrects the observed image on the basis of the estimated phase error. It should be noted that as the linearity judgment unit in the phase evaluation unit 5, the linearity judgment unit 25 (see FIG. 11) in the fourth embodiment may be used. Further, as the phase calculation unit and the linearity judgment unit in the phase evaluation unit 5, the phase calculation unit 26 (see FIG. 14) and the linearity judgment unit 27 (see FIG. 14) in the fifth embodiment may be used.

An operation of the synthetic-aperture-radar-signal processing device in the sixth embodiment will now be described with reference to the flowchart in FIG. 20.

Figure 20:
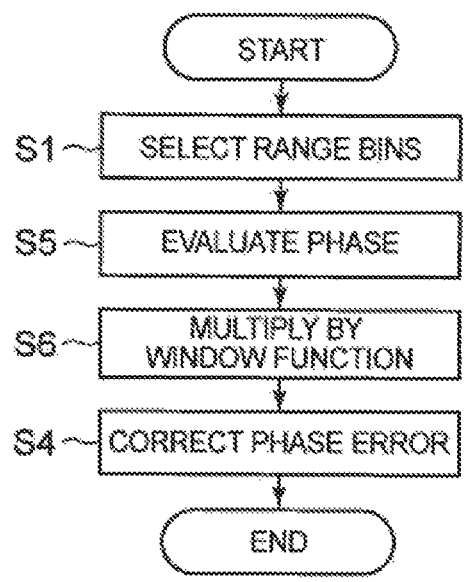
FIG. 20 is a flowchart illustrating an operation of the synthetic-aperture-radar-signal processing device of the sixth embodiment.

When comparing the operation of the synthetic-aperture-radar-signal processing device illustrated in FIG. 20 with the phase evaluation operation of the phase evaluation unit 2 in the second embodiment illustrated in FIG. 6, the phase evaluation processing (step S5) by the phase evaluation unit 5 differs from the phase evaluation processing (step S2) in the first embodiment, and the window function multiplication processing (step S6) by the window function multiplication unit 6 differs from the window function multiplication processing (step S3) in the first embodiment. The other processing is identical to that in the first embodiment.

The phase evaluation unit 5 evaluates a phase for a respective one of the plurality of range bins selected in the processing in step S1, and outputs an azimuth range in which the phases in the azimuth direction are deemed to form a linear line in each range bin, to the window function multiplication unit 6 (step S5).

Figure 21:
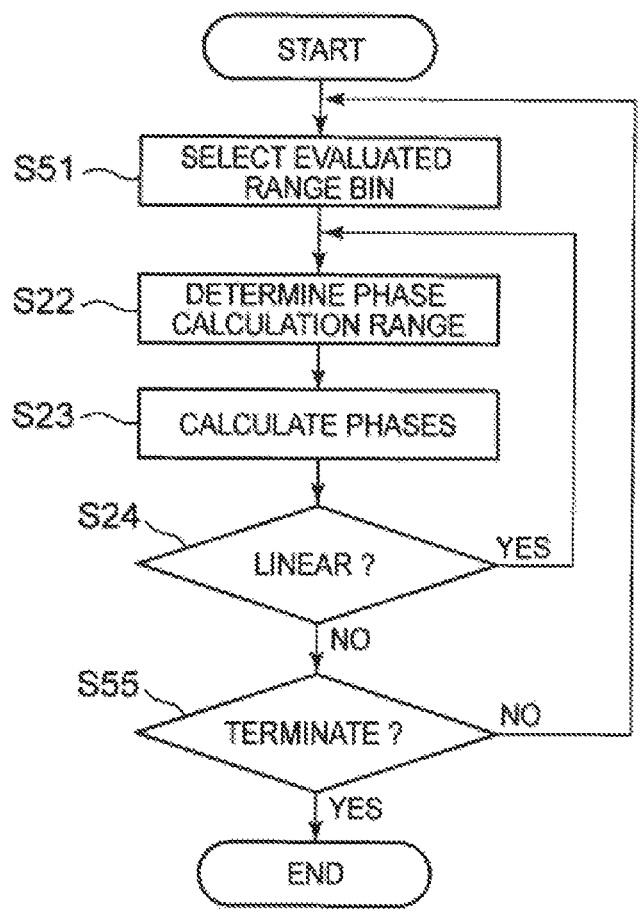
FIG. 21 is a flowchart illustrating an operation of the phase evaluation unit in the sixth embodiment.

FIG. 21 is a flowchart illustrating an operation of the phase evaluation unit 5. When comparing the operation of the phase evaluation unit 5 illustrated in FIG. 21 with the operation of the phase evaluation unit 2 in the second embodiment illustrated in FIG. 6, the evaluated range bin selection processing (step S51) differs from the evaluated range bin selection processing (step S21) in the second embodiment. Further, the sixth embodiment differs from the second embodiment in that end judgment processing (step S55) by the end judgment unit 55 has been added. The other processing is identical to that in the second embodiment.

The evaluated range bin selection unit 51 selects a range bin for phase evaluation, from the range bins selected in the processing in step S1 (step S51). The evaluated range bin selection unit 51 selects a range bin from among the range bin numbers selected in the processing in step S1, as an evaluated range bin. Each time a feedback is received from the end judgment unit 55, the evaluated range bin selection unit 51 selects another range bin as the evaluated range bin. For example, the evaluated range bin selection unit 51 selects range bins in descending order of luminous value of the pixel included therein, from the range bins selected in the processing in step S1.

The end judgment unit 55 judges whether the phase evaluation has been completed for a predetermined number of range bins (step S55). For example, the end judgment unit 55 judges whether a repeat count is equal to the predetermined number of range bins. When they are equal, the end judgment unit 55 terminates the repeat processing. The phase evaluation unit 5 outputs the range bin numbers and the azimuth ranges respectively corresponding thereto, to the window function multiplication unit 6.

The window function multiplication unit 6 designs rectangular windows for the respective range bins selected in the processing in step S1, each rectangular window having, as a pass area, the range in which the phases are deemed to form a linear line, obtained for that range bin and input from the phase evaluation unit 5. Then, the window function multiplication unit 6 multiplies the respective ones of the selected range bins by the corresponding window functions, and outputs the resultant range bins to the phase error correction unit 4.

The phase error correction unit 4 estimates the phase error due to sway, from the input range bins, and corrects the observed image on the basis of the estimated phase error. Specifically, the phase error correction unit 4 calculates, for each range bin, the range in which the phases in the azimuth direction become to form linear line, to correct the observed image.

Advantageous effects of the sixth embodiment will be described. The synthetic-aperture-radar-signal processing device in the sixth embodiment is configured to evaluate the phase in each range bin independently, and to obtain, for each range bin, a region for estimating the phase error in autofocusing. With such a configuration, the synthetic-aperture-radar-signal processing device is able to estimate the phase error by using, in each range bin, only the region in which the signal from an isolated reflection point is dominant.

Figure 22:
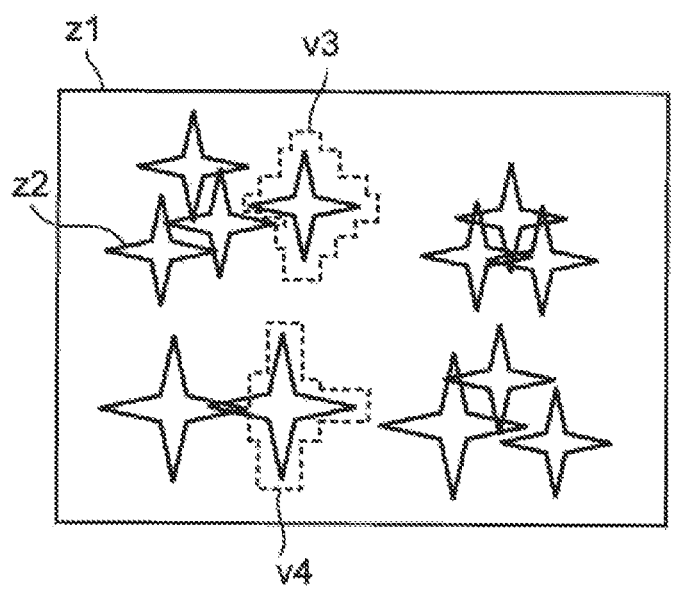
FIG. 22 is a diagram illustrating advantageous effects of the sixth embodiment.

FIG. 22 is a diagram illustrating the advantageous effects of the sixth embodiment. In FIG. 22, z1 shows an observed image of a region where there are a plurality of reflection points, as with z1 shown in FIG. 28. z2 shows a range in which a reflected signal from a specific point is observed, as with z2 shown in FIG. 28. v3 and v4 show regions which are determined for autofocusing in the sixth embodiment. As shown in FIG. 22, only the regions in which the information on an isolated reflection point is dominant are taken out.

Accordingly, the synthetic-aperture-radar-signal processing device is able to obtain a corrected image, with autofocusing being implemented more robustly against the signals from other reflection points and the background noise even in the range direction of the isolated reflection point. Further, the synthetic-aperture-radar-signal processing device in the sixth embodiment determines the range in which the phase fulfills the conditions for each range bin, so the device can implement the autofocusing even in the case where the isolated reflection point is insufficient in intensity and is difficult to detect with the amplitude information alone.

Embodiment 7

Figure 23:
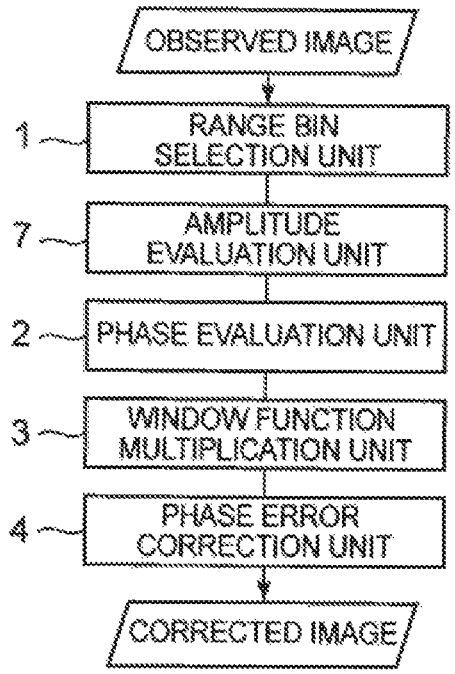
FIG. 23 is a block diagram showing a seventh embodiment of a synthetic-aperture-radar-signal processing device.

FIG. 23 is a block diagram showing a seventh embodiment of a synthetic-aperture-radar-signal processing device. As shown in FIG. 23, the synthetic-aperture-radar-signal processing device in the seventh embodiment has an amplitude evaluation unit 7 added to the synthetic-aperture-radar-signal processing device in the first embodiment shown in FIG. 1. The other configurations and functions are identical to the configurations and functions of the synthetic-aperture-radar-signal processing device in the first embodiment.

The amplitude evaluation unit 7, for a respective one of the range bins selected in the range bin selection unit 1, sets any point having an amplitude value not higher than a threshold value, with reference to a point with a high amplitude value, to 0. The amplitude evaluation unit 7 may use a point with a maximum amplitude value as the reference point with the high amplitude value. It should be noted that the amplitude evaluation unit 7 may use, as the threshold value, a predetermined value or a value determined on the basis of the ratio with the background noise amount.

For the phase evaluation unit and the window function multiplication unit, the phase evaluation unit 5 and the window function multiplication unit 6 in the sixth embodiment may be used. For the linear judgment unit in the phase evaluation unit 2, the linearity judgment unit 24 in the second embodiment may be used, or the linearity judgment unit 25 in the fourth embodiment may be used. For the phase calculation unit and the linearity judgment unit in the phase evaluation unit 2, the phase calculation unit 23 and the linearity judgment unit 24 in the second embodiment may be used, or the phase calculation unit 26 and the linearity judgment unit 27 in the fifth embodiment may be used.

Figure 24:
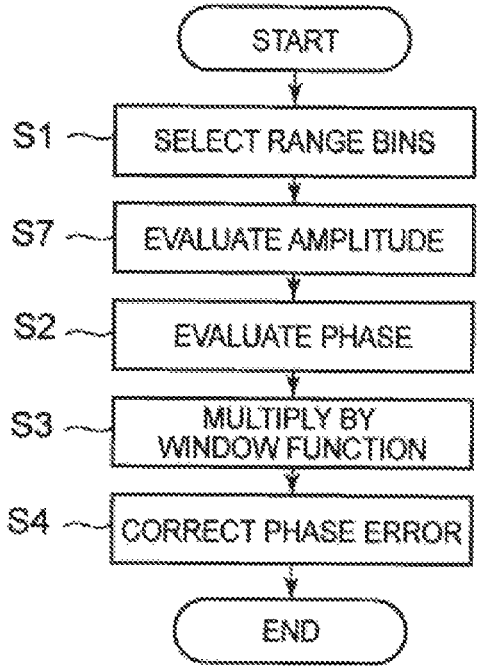
FIG. 24 is a flowchart illustrating an operation of the synthetic-aperture-radar-signal processing device of the seventh embodiment.

An operation of the synthetic-aperture-radar-signal processing device in the seventh embodiment will now be described with reference to the flowchart in FIG. 24.

In the seventh embodiment, amplitude evaluation processing (step S7) has been added to the processing in the first embodiment shown in FIG. 2. The other processing is identical to that in the first embodiment.

For a respective one of the range bins selected in the processing in step S1, the amplitude evaluation unit 7 sets a value of any point having an amplitude below a threshold value, with reference to a point with a high amplitude, to 0. When determining a point with a high amplitude for each range bin, the amplitude evaluation unit 7 sets a point with a maximum amplitude value in that range bin, for example, as the point with the high amplitude. While the amplitude evaluation unit 7 may use for example a predetermined value, such as −20 dB from the maximum amplitude value, as the threshold value, the unit may set the threshold value on the basis of the ratio in amplitude between the background noise and the reference point.

The amplitude evaluation unit 7 supplies any range bin that includes a point with an amplitude of not 0, to the phase evaluation unit 2.

Advantageous effects of the seventh embodiment will be described. The synthetic-aperture-radar-signal processing device of the seventh embodiment is configured to roughly determine the region for estimating the phase error in autofocusing on the basis of the amplitude, and evaluate the phase within that range. With such a configuration, the synthetic-aperture-radar-signal processing device can extract a region in which a signal from an isolated reflection point is dominant over the entire two-dimensional image for estimating the phase error, on the basis of the amplitude information when the background noise and the other reflected signals are low in intensity, and on the basis of the phase information when the reflected signals are high in intensity.

While the synthetic-aperture-radar-signal processing device in each embodiment described above can be configured with hardware, it can also be implemented by computer programs.

Figure 25:
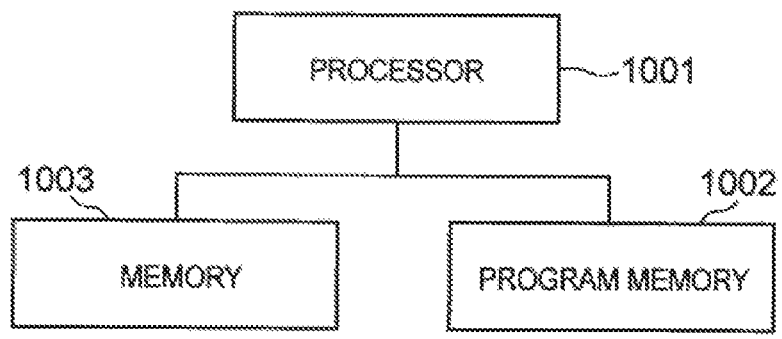
FIG. 25 is a block diagram showing an exemplary configuration of an information processing device capable of implementing the functions of the synthetic-aperture-radar-signal processing device.
Figure 26:
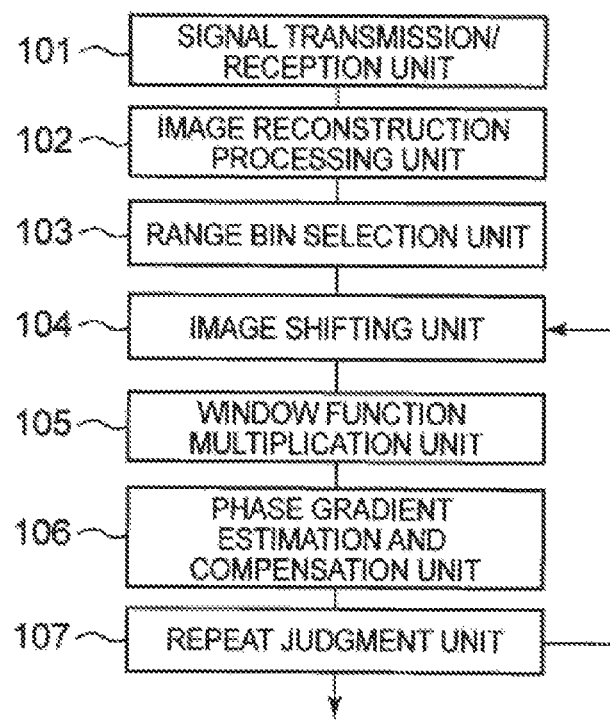
FIG. 26 is a block diagram showing a configuration of a synthetic aperture radar device described in PTL 1.
Figure 27:
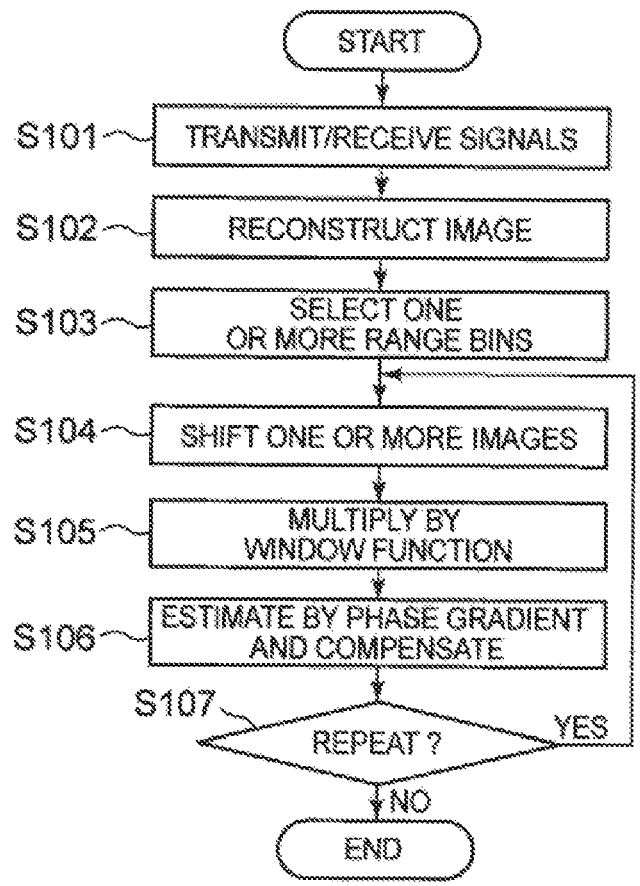
FIG. 27 is a flowchart illustrating an operation of the synthetic aperture radar device shown in FIG. 26.

FIG. 25 is a block diagram showing an exemplary configuration of an information processing device capable of implementing the functions of the synthetic-aperture-radar-signal processing device in each embodiment described above. The information processing device shown in FIG. 25 includes one or more processors, such as a central processing unit (CPU), a program memory 1002, and a memory 1003. FIG. 25 illustrates the information processing device having one processor 1001.

For the program memory 1002, a semiconductor storage medium such as a flash read only memory (ROM) or a magnetic storage medium such as a hard disk can be used. The program memory 1002 stores programs for implementing the functions of the blocks (range bin selection unit 1, phase evaluation unit 2, 5, window function multiplication unit 3, 6, phase error correction unit 4, amplitude evaluation unit 7) in the synthetic-aperture-radar-signal processing device in each embodiment described above.

For the memory 1003, a semiconductor storage medium or a magnetic storage medium can be used. The memory 1003 stores temporary data generated while the synthetic-aperture-radar-signal processing device is performing processing, for example. The program memory 1002 and the memory 1003 may be integrated.

The processor 1001 performs processing in accordance with the programs stored in the program memory 1002 to implement the functions of the synthetic-aperture-radar-signal processing device in each embodiment described above. When a plurality of processors are installed, the processors cooperate to implement the functions of the synthetic-aperture-radar-signal processing device.

Apart of or all of the above embodiments may also be described by the following supplementary notes, although the configurations of the present invention are not limited to the following configurations.

(Supplementary note 1) A synthetic-aperture-radar-signal processing device comprising:

a range bin selection unit configured to select, from an observed image, range bins including a signal from an isolated reflection point;

a phase evaluation unit configured to evaluate phases in an azimuth direction in the range bins;

a window function multiplication unit configured to design a window function on the basis of results of the evaluation by the phase evaluation unit and multiply the range bins by the window function; and a phase error correction unit configured to correct the observed image by estimating a phase error from the range bins multiplied by the window function.

(Supplementary note 2) The synthetic-aperture-radar-signal processing device according to supplementary note 1, wherein the phase evaluation unit includes an evaluated range bin selection unit configured to select a range bin from among the range bins as an evaluated range bin, a phase calculation range determination unit configured to determine a calculation range of the phases in the evaluated range bin, a phase calculation unit configured to obtain the phases in the calculation range of the evaluated range bin, and a linearity judgment unit configured to judge whether the phases obtained by the phase calculation unit form a linear line.

(Supplementary note 3) The synthetic-aperture-radar-signal processing device according to supplementary note 2, wherein the linearity judgment unit includes a regression line calculation unit configured to obtain a regression line of the phases obtained by the phase calculation unit, a correlation coefficient calculation unit configured to obtain a correlation coefficient between the phases and the regression line, and a threshold judgment unit configured to perform threshold judgment on the correlation coefficient to judge whether the phases form the linear line.

(Supplementary note 4) The synthetic-aperture-radar-signal processing device according to supplementary note 2, wherein the linearity judgment unit includes a regression line calculation unit configured to obtain a regression line of the phases obtained by the phase calculation unit, an error calculation unit configured to calculate an error between the phases obtained by the phase calculation unit and the regression line, and a threshold judgment unit configured to perform threshold judgment on the error to judge whether the phases form the linear line.

(Supplementary note 5) The synthetic-aperture-radar-signal processing device according to supplementary note 2, wherein the phase calculation unit calculates phases on a frequency axis in the evaluated range bin in the calculation range, and the linearity judgment unit includes
  a gradient calculation unit configured to calculate a gradient vector of the phases,
  a standard deviation calculation unit configured to calculate a standard deviation of the gradient vector, and
  a threshold judgment unit configured to perform threshold judgment on the standard deviation to judge whether the phases form the linear line.

(Supplementary note 6) The synthetic-aperture-radar-signal processing device according to any of supplementary notes 1 to 5, wherein the phase evaluation unit selects a plurality of range bins from the range bins selected by the range bin selection unit, and the phase error correction unit corrects the observed image by calculating, for a respective one of the plurality of range bins, a range in which the phases in the azimuth direction form the linear line.

(Supplementary note 7) The synthetic-aperture-radar-signal processing device according to any of supplementary notes 1 to 5, further comprising:

an amplitude evaluation unit configured to determine a range in which an amplitude value in the azimuth direction is higher than a threshold value, in the range bins selected by the range bin selection unit, wherein the amplitude evaluation unit outputs the range bins within the range, to the phase evaluation unit.

(Supplementary note 8) A synthetic-aperture-radar-signal processing method comprising:

selecting, from an observed image, range bins including a signal from an isolated reflection point;

evaluating phases in an azimuth direction in the range bins;

designing a window function on the basis of results of the evaluation and multiplying the range bins by the window function; and correcting the observed image by estimating a phase error from the range bins multiplied by the window function.

(Supplementary note 9) The synthetic-aperture-radar-signal processing method according to supplementary note 8, wherein, when evaluating the phases, selecting a range bin from among the range bins as an evaluated range bin, determining a calculation range of the phases in the evaluated range bin, obtaining the phases in the calculation range of the evaluated range bin, and judging whether the obtained phases form a linear line.

(Supplementary note 10) The synthetic-aperture-radar-signal processing method according to supplementary note 9, wherein, when judging whether the phases form the linear line, obtaining a regression line of the obtained phases, obtaining a correlation coefficient between the phases and the regression line, and performing threshold judgment on the correlation coefficient to judge whether the phases form the linear line.

(Supplementary note 11) The synthetic-aperture-radar-signal processing method according to supplementary note 9, wherein, when judging whether the phases form the linear line, obtaining a regression line of the obtained phases, calculating an error between the obtained phases and the regression line, and performing threshold judgment on the error to judge whether the phases form the linear line.

(Supplementary note 12) The synthetic-aperture-radar-signal processing method according to supplementary note 9, wherein, when obtaining the phases in the evaluated range bin, calculating phases on a frequency axis in the evaluated range bin in the calculation range, and when judging whether the phases form the linear line,
  calculating a gradient vector of the phases,
  calculating a standard deviation of the gradient vector, and
  performing threshold judgment on the standard deviation to judge whether the phases form the linear line.

(Supplementary note 13) The synthetic-aperture-radar-signal processing method according to any of supplementary notes 8 to 12, wherein, when evaluating the phases, selecting a plurality of range bins from the selected range bins, and when correcting the observed image, calculating, for a respective one of the plurality of range bins, a range in which the phases in the azimuth direction form the linear line, to correct the observed image.

(Supplementary note 14) The synthetic-aperture-radar-signal processing method according to any of supplementary notes 8 to 12, further comprising determining a range in which an amplitude value in the azimuth direction is higher than a threshold value, in the selected range bins, wherein when evaluating the phases, targeting the range bins within the determined range.

(Supplementary note 15) A synthetic-aperture-radar-signal processing program causing a computer to perform:

range bin selection processing of selecting, from an observed image, range bins including a signal from an isolated reflection point;

phase evaluation processing of evaluating phases in an azimuth direction in the range bins;

window function multiplication processing of designing a window function on the basis of results of the evaluation in the phase evaluation processing and multiplying the range bins by the window function; and phase error correction processing of correcting the observed image by estimating a phase error from the range bins multiplied by the window function.

(Supplementary note 16) The synthetic-aperture-radar-signal processing program according to supplementary note 15, causing the computer to perform, in the phase evaluation processing,
  evaluated range bin selection processing of selecting a range bin from among the range bins as an evaluated range bin,
  phase calculation range determination processing of determining a calculation range of the phases in the evaluated range bin,
  phase calculation processing of obtaining the phases in the calculation range of the evaluated range bin, and linearity judgment processing of judging whether the phases obtained in the phase calculation processing form a linear line.

(Supplementary note 17) The synthetic-aperture-radar-signal processing program according to supplementary note 16, causing the computer to perform, in the linearity judgment processing, regression line calculation processing of obtaining a regression line of the phases obtained in the phase calculation processing, correlation coefficient calculation processing of obtaining a correlation coefficient between the phases and the regression line, and threshold judgment processing of performing threshold judgment on the correlation coefficient to judge whether the phases form the linear line.

(Supplementary note 18) The synthetic-aperture-radar-signal processing program according to supplementary note 16, causing the computer to perform, in the linearity judgment processing, regression line calculation processing of obtaining a regression line of the phases obtained in the phase calculation processing, error calculation processing of calculating an error between the phases obtained in the phase calculation processing and the regression line, and threshold judgment processing of performing threshold judgment on the error to judge whether the phases form the linear line.

(Supplementary note 19) The synthetic-aperture-radar-signal processing program according to supplementary note 16, causing the computer to perform, in the phase calculation processing, calculating phases on a frequency axis in the evaluated range bin in the calculation range, and in the linearity judgment processing, gradient calculation processing of calculating a gradient vector of the phases, standard deviation calculation processing of calculating a standard deviation of the gradient vector, and threshold judgment processing of performing threshold judgment on the standard deviation to judge whether the phases form the linear line.

(Supplementary note 20) The synthetic-aperture-radar-signal processing program according to any of supplementary notes 15 to 19, causing the computer to perform, in the phase evaluation processing, selecting a plurality of range bins from the range bins selected in the range bin selection processing, and in the phase error correction processing, correcting the observed image by calculating, for a respective one of the plurality of range bins, a range in which the phases in the azimuth direction form a linear line.

(Supplementary note 21) The synthetic-aperture-radar-signal processing program according to any of supplementary notes 15 to 19, causing the computer to further perform:

amplitude evaluation processing of determining, with respect to the range bins selected in the range bin selection processing, a range in which an amplitude value in the azimuth direction is higher than a threshold value, and in the amplitude evaluation processing, outputting the range bins within the range, to the phase evaluation processing.

(Supplementary note 22) A recording medium storing a synthetic-aperture-radar-signal processing program causing to perform:

range bin selection processing of selecting, from an observed image, range bins including a signal from an isolated reflection point;

phase evaluation processing of evaluating phases in an azimuth direction in the range bins;

window function multiplication processing of designing a window function on the basis of results of the evaluation in the phase evaluation processing and multiplying the range bins by the window function; and phase error correction processing of correcting the observed image by estimating phases error from the range bins multiplied by the window function.

(Supplementary note 23) The recording medium storing the synthetic-aperture-radar-signal processing program according to supplementary note 22, causing to perform, in the phase evaluation processing, evaluated range bin selection processing of selecting a range bin from among the range bins as an evaluated range bin, phase calculation range determination processing of determining a calculation range of the phases in the evaluated range bin, phase calculation processing of obtaining the phases in the calculation range of the evaluated range bin, and linearity judgment processing of judging whether the phases obtained in the phase calculation processing form a linear line.

(Supplementary note 24) The recording medium storing the synthetic-aperture-radar-signal processing program according to supplementary note 23, causing to perform, in the linearity judgment processing, regression line calculation processing of obtaining a regression line of the phases obtained in the phase calculation processing, correlation coefficient calculation processing of obtaining a correlation coefficient between the phases and the regression line, and threshold judgment processing of performing threshold judgment on the correlation coefficient to judge whether the phases form the linear line.

(Supplementary note 25) The recording medium storing the synthetic-aperture-radar-signal processing program according to supplementary note 23, causing to perform, in the linearity judgment processing, regression line calculation processing of obtaining a regression line of the phases obtained in the phase calculation processing, error calculation processing of calculating an error between the phases obtained in the phase calculation processing and the regression line, and threshold judgment processing of performing threshold judgment on the error to judge whether the phases form the linear line.

(Supplementary note 26) The recording medium storing the synthetic-aperture-radar-signal processing program according to supplementary note 23, causing to perform, in the linearity judgment processing, regression line calculation processing of obtaining a regression line of the phases obtained in the phase calculation processing, error calculation processing of calculating an error between the phases obtained in the phase calculation processing and the regression line, and threshold judgment processing of performing threshold judgment on the error to judge whether the phases form the linear line.

(Supplementary note 27) The recording medium storing the synthetic-aperture-radar-signal processing program according to any of supplementary notes 22 to 26, causing to perform, in the phase evaluation processing, selecting a plurality of range bins from the range bins selected in the range bin selection processing, and in the phase error correction processing, correcting the observed image by calculating, for a respective one of the plurality of range bins, a range in which the phases in the azimuth direction form a linear line.

(Supplementary note 28) The recording medium storing the synthetic-aperture-radar-signal processing program according to any of supplementary notes 22 to 26, causing to further perform:

amplitude evaluation processing of determining, with respect to the range bins selected in the range bin selection processing, a range in which an amplitude value in the azimuth direction is higher than a threshold value, and in the amplitude evaluation processing, outputting the range bins within the range, to the phase evaluation processing.

INDUSTRIAL APPLICABILITY

The present invention is applicable to a system that corrects synthetic aperture radar images obtained using a satellite, aircraft, or the like. The function of estimating the phase error in the present invention is also applicable to trajectory estimation of the satellite or aircraft.

REFERENCE SIGNS LIST

1 range bin selection unit
2 phase evaluation unit
3 window function multiplication unit
4 phase error correction unit
5 phase evaluation unit
6 window function multiplication unit
7 amplitude evaluation unit
21 evaluated range bin selection unit
22 phase calculation range determination unit
23, 26 phase calculation unit
24, 25, 27 linearity judgment unit
51 evaluated range bin selection unit
55 end judgment unit
241 regression line calculation unit
242 correlation coefficient calculation unit
243, 253, 273 threshold judgment unit
252 error calculation unit
271 gradient calculation unit
272 standard deviation calculation unit
1001 processor
1002 program memory
1003 memory

What is claimed is:

1. A synthetic-aperture-radar-signal processing device comprising:
    a memory storing instructions;
    one or more processors configured to execute the instructions to:
        select, from an observed image, range bins including a signal from an isolated reflection point;
        evaluate phases in an azimuth direction in the range bins;
        design a window function using results of the evaluation, wherein the window has a pass range in the azimuth direction in which the phases form about a linear line, and multiply the range bins by the window function;
        correct the observed image by estimating a phase error from the range bins multiplied by the window function;
        select a range bin from among the range bins as an evaluated range bin;
        determine a calculation range of the phases in the evaluated range bin;
        obtain the phases in the calculation range of the evaluated range bin; and
        judge whether the obtained phases form a linear line.

2. The synthetic-aperture-radar-signal processing device according to claim 1, wherein the one or more processors are further configured to execute the instructions to:
    obtain a regression line of the obtained phases;
    obtain a correlation coefficient between the phases and the regression line; and
    perform a threshold judgment on the correlation coefficient to judge whether the phases form the linear line.

3. The synthetic-aperture-radar-signal processing device according to claim 1, wherein the one or more processors are further configured to execute the instructions to:
    obtain a regression line of the obtained phases;
    calculate an error between the obtained phases and the regression line; and
    perform a threshold judgment on the error to judge whether the phases form the linear line.

4. The synthetic-aperture-radar-signal processing device according to claim 1, wherein the one or more processors are further configured to execute the instructions to:
    calculate phases on a frequency axis in the evaluated range bin in the calculation range;
    calculate a gradient vector of the phases;
    calculate a standard deviation of the gradient vector; and
    perform a threshold judgment on the standard deviation to judge whether the phases form the linear line.

5. The synthetic-aperture-radar-signal processing device according to claim 1, wherein the one or more processors are further configured to execute the instructions to:
    select a plurality of range bins from the selected range bins; and
    correct the observed image by calculating, for a respective one of the plurality of range bins, a range in which the phases in the azimuth direction form a linear line.

6. The synthetic-aperture-radar-signal processing device according to claim 1, wherein the one or more processors are further configured to execute the instructions to:
    determine a range in which an amplitude value in the azimuth direction is higher than a threshold value, in the selected range bins; and
    output the range bins within the range, for the phase evaluation.

7. A synthetic-aperture-radar-signal processing method comprising:
    selecting, from an observed image, range bins including a signal from an isolated reflection point;
    evaluating phases in an azimuth direction in the range bins;
    designing a window function using results of the evaluation, wherein the window has a pass range in the azimuth direction in which the phases form about a linear line, and multiplying the range bins by the window function; and
    correcting the observed image by estimating a phase error from the range bins multiplied by the window function, wherein, the evaluating phases comprises:
selecting a range bin from among the range bins as an evaluated range bin;
determining a calculation range of the phases in the evaluated range bin;
obtaining the phases in the calculation range of the evaluated range bin; and
judging whether the obtained phases form a linear line.

8. The synthetic-aperture-radar-signal processing method according to claim 7, wherein the judging whether the obtained phases form the linear line comprises:
obtaining a regression line of the obtained phases;
obtaining a correlation coefficient between the phases and the regression line; and
performing a threshold judgment on the correlation coefficient to judge whether the phases form the linear line.

9. The synthetic-aperture-radar-signal processing method according to claim 7, wherein the judging whether the obtained phases form the linear line comprises:
obtaining a regression line of the obtained phases;
obtaining an error between the phases and the regression line; and
performing a threshold judgment on the error to judge whether the phases form the linear line.

10. The synthetic-aperture-radar-signal processing method according to claim 7, wherein the obtaining the phases in the evaluated range bin comprises calculating phases on a frequency axis in the evaluated range bin in the calculation range, and
wherein the judging whether the phases form the linear line comprises:
calculating a gradient vector of the phases;
calculating a standard deviation of the gradient vector; and
performing a threshold judgment on the standard deviation to judge whether the phases form the linear line.

11. The synthetic-aperture-radar-signal processing method according to claim 7, wherein the evaluating phases comprises selecting a plurality of range bins from the selected range bins; and
wherein the correcting the observed image comprises calculating, for a respective one of the plurality of range bins, a range in which the phases in the azimuth direction form the linear line, to correct the observed image.

12. The synthetic-aperture-radar-signal processing method according to claim 7, further comprising:
determining a range in which an amplitude value in the azimuth direction is higher than a threshold value, in the selected range bins,
wherein the evaluating phases comprises targeting the range bins within the determined range.

13. A non-transitory computer readable recording medium storing a synthetic-aperture-radar-signal processing program which, if executed by a processor, performs operations comprising:
range bin selection processing comprising selecting, from an observed image, range bins including a signal from an isolated reflection point;
phase evaluation processing comprising evaluating phases in an azimuth direction in the range bins;
window function multiplication processing comprising designing a window function using results of the evaluation in the phase evaluation processing, wherein the window has a pass range in the azimuth direction in which the phases form about a linear line, and multiplying the range bins by the window function;
phase error correction processing comprising correcting the observed image by estimating a phase error from the range bins multiplied by the window function;
wherein the phase evaluation processing comprises:
evaluated range bin selection processing comprising selecting a range bin from among the range bins as an evaluated range bin;
phase calculation range determination processing comprising determining a calculation range of the phases in the evaluated range bin;
phase calculation processing comprising obtaining the phases in the calculation range of the evaluated range bin; and
linearity judgment processing comprising judging whether the phases obtained in the phase calculation processing form a linear line.

14. The recording medium according to claim 13, wherein the operations further comprise:
in the linearity judgment processing:
regression line calculation processing comprising obtaining a regression line of the phases obtained in the phase calculation processing;
correlation coefficient calculation processing comprising obtaining a correlation coefficient between the phases and the regression line; and
threshold judgment processing comprising performing a threshold judgment on the correlation coefficient to judge whether the phases form the linear line.

15. The recording medium according to claim 13, wherein the operations further comprise:
in the linearity judgment processing:
regression line calculation processing comprising obtaining a regression line of the phases obtained in the phase calculation processing;
error calculation processing comprising calculating an error between the phases obtained in the phase calculation processing and the regression line; and
threshold judgment processing comprising performing a threshold judgment on the error to judge whether the phases form the linear line.

16. The recording medium according to claim 13, wherein the operations further comprise:
in the phase calculation processing, calculating phases on a frequency axis in the evaluated range bin in the calculation range; and
in the linearity judgment processing:
gradient calculation processing comprising calculating a gradient vector of the phases;
standard deviation calculation processing comprising calculating a standard deviation of the gradient vector; and
threshold judgment processing comprising performing a threshold judgment on the standard deviation to judge whether the phases form the linear line.

17. The recording medium according to claim 13, wherein the operations further comprise:
in the phase evaluation processing, selecting a plurality of range bins from the range bins selected in the range bin selection processing; and
in the phase error correction processing, correcting the observed image by calculating, for a respective one of the plurality of range bins, a range in which the phases in the azimuth direction form a linear line.

* * * * *